(12) United States Patent
Fujishiro et al.

(10) Patent No.: US 9,888,418 B2
(45) Date of Patent: *Feb. 6, 2018

(54) MOBILE COMMUNICATION METHOD

(71) Applicant: KYOCERA CORPORATION, Kyoto (JP)

(72) Inventors: Masato Fujishiro, Yokohama (JP); Chiharu Yamazaki, Yokohama (JP); Noriyoshi Fukuta, Yokohama (JP); Hiroyuki Adachi, Yokohama (JP); Atsuhisa Inakoshi, Yokohama (JP)

(73) Assignee: KYOCERA Corporation, Kyoto (JP)

(*) Notice: Subject to any disclaimer, the term of this patent is extended or adjusted under 35 U.S.C. 154(b) by 51 days.

This patent is subject to a terminal disclaimer.

(21) Appl. No.: 15/189,524

(22) Filed: Jun. 22, 2016

(65) Prior Publication Data
US 2016/0302123 A1    Oct. 13, 2016

Related U.S. Application Data

(63) Continuation of application No. 14/249,287, filed on Apr. 9, 2014, now Pat. No. 9,408,126, which is a
(Continued)

(51) Int. Cl.
H04W 36/00 (2009.01)
H04W 4/00 (2009.01)
(Continued)

(52) U.S. Cl.
CPC ........ H04W 36/165 (2013.01); H04W 24/10 (2013.01); H04W 28/08 (2013.01);
(Continued)

(58) Field of Classification Search
CPC ................................. H04W 36/165
(Continued)

(56) References Cited

U.S. PATENT DOCUMENTS 5,907,808 A    5/1999  Vaara et al.
7,027,816 B2   4/2006  Kikuma et al.
(Continued)

FOREIGN PATENT DOCUMENTS

EP    1233637 A1    8/2002
JP    2001-136558 A 5/2001
(Continued)

OTHER PUBLICATIONS

Japanese Office Action; Japanese Application No. JP2013-508655; dated Feb. 18, 2014.
(Continued)

Primary Examiner — Joel Ajayi
(74) Attorney, Agent, or Firm — Studebaker & Brackett PC

(57) ABSTRACT

A radio terminal UE according to one embodiment includes a radio communication unit 210 configured to receive a plurality of parameters including a first parameter for high-speed movement and a second parameter for non-high-speed movement as parameters for processing for switching to a neighboring base station from a base station connected to the radio terminal, and a controller 260 configured to acquire movement speed information indicating a movement speed of the radio terminal and to select a parameter corresponding to the movement speed information. The first parameter is configured to inhibit processing for switching to a Pico base station PeNB which is included in the neighboring base stations.

2 Claims, 16 Drawing Sheets

Related U.S. Application Data continuation of application No. 13/438,561, filed on Apr. 3, 2012, now Pat. No. 8,744,450.

(60) Provisional application No. 61/471,304, filed on Apr. 4, 2011.

(51) Int. Cl.

| | | |
|---|---|---|
| *H04W 36/16* | (2009.01) | |
| *H04W 28/08* | (2009.01) | |
| *H04W 28/18* | (2009.01) | |
| *H04W 36/32* | (2009.01) | |
| *H04W 24/10* | (2009.01) | |
| *H04W 84/04* | (2009.01) | |

(52) U.S. Cl.
 CPC ........... *H04W 28/18* (2013.01); *H04W 36/32* (2013.01); *H04W 84/045* (2013.01)

(58) Field of Classification Search
 USPC .................................. 455/436–448; 370/332
 See application file for complete search history.

(56) References Cited

U.S. PATENT DOCUMENTS

| | | |
|---|---|---|
| 8,340,730 B2 | 12/2012 | Pallotta |
| 2004/0029588 A1 | 2/2004 | Kikuma et al. |
| 2005/0130662 A1 | 6/2005 | Murai |
| 2009/0046632 A1 | 2/2009 | Nanda et al. |
| 2009/0047931 A1 | 2/2009 | Nanda et al. |
| 2009/0286496 A1 | 11/2009 | Yavuz et al. |
| 2011/0009067 A1 | 1/2011 | Iwamura et al. |
| 2011/0105109 A1 | 5/2011 | Uemura et al. |

FOREIGN PATENT DOCUMENTS

| | | |
|---|---|---|
| JP | 2003-244741 A | 8/2003 |
| JP | 2004-048528 A | 2/2004 |
| JP | 2006-005597 A | 1/2006 |
| NO | 2009/150943 A1 | 12/2009 |
| WO | 95/28813 A1 | 10/1995 |
| WO | 2009/026162 A1 | 2/2009 |

OTHER PUBLICATIONS

3GPP TSG-RAN Meeting #51; RP-110438; "HetNet mobility improvements for LTE"; Kansas City, Mar. 15-18, 2011; pp. 1-5.

An Office Action; "Notice of Reasons for Rejection," issued by the Japanese Patent Office dated Nov. 25, 2014, which corresponds to Japanese Patent Application No. 2014-084835 and is related to U.S. Appl. No. 14/249,287; with English language statement of relevance.

An Office Action; "Notice of Reasons for Rejection," issued by the Japanese Patent Office on Dec. 16, 2014, which corresponds to Japanese Patent Application No. 2014-084830 and is related to U.S. Appl. No. 14/249,287; with English language statement of relevance.

New Postcom; "Detection method for the short stay problems"; 3GPP TSG-RAN WG3 Meeting #69bis; R3-102614; Oct. 11-15, 2010; pp. 1-5; Xi'an, China.

The extended European search report issued by the European Patent Office on Jun. 17, 2015, which corresponds to European Patent Application No. 11862986.4-1854 and is related to U.S. Appl. No. 14/249,287.

Communication pursuant to Rules 70(2) and 70a(2) EPC issued by the European Patent Office on Jul. 3, 2015, which corresponds to European Patent Application No. 11862986.4-1854 and is related to U.S. Appl. No. 14/249,287.

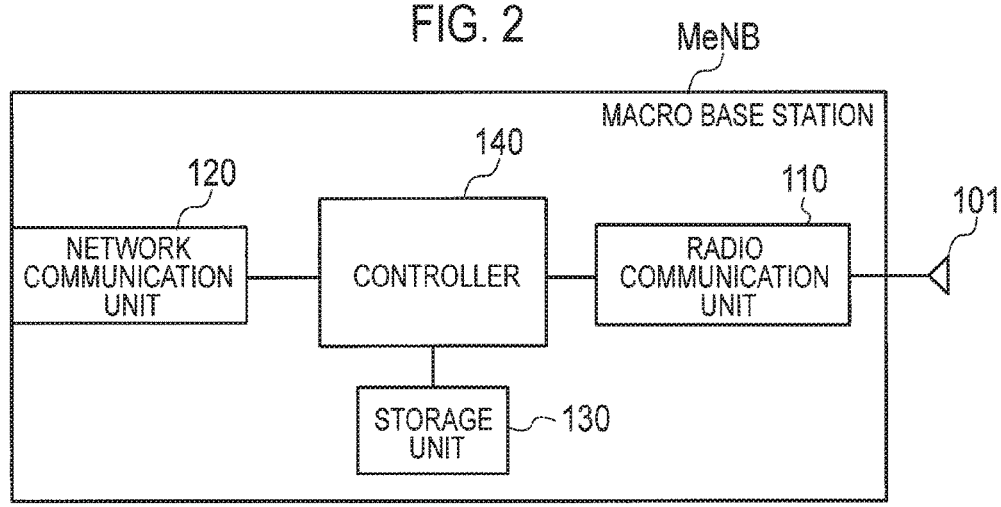
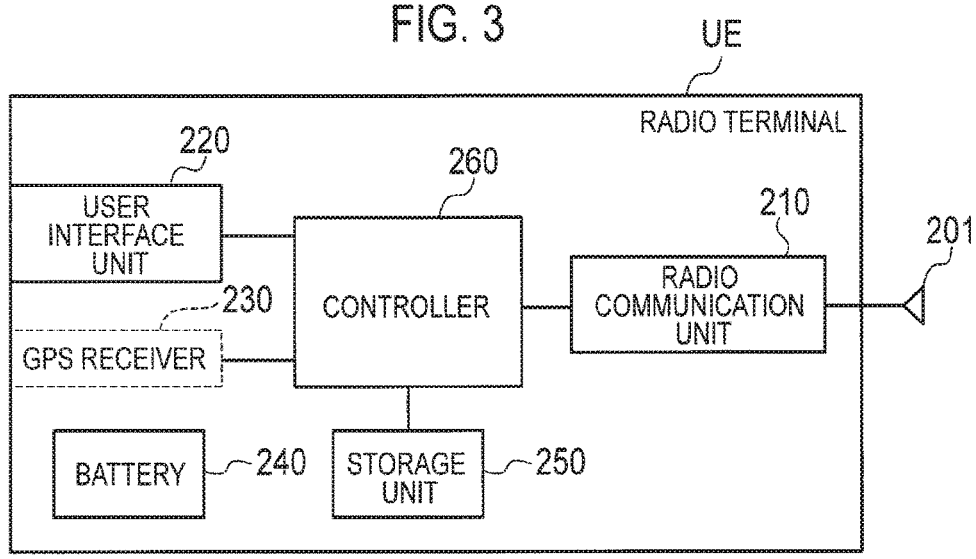
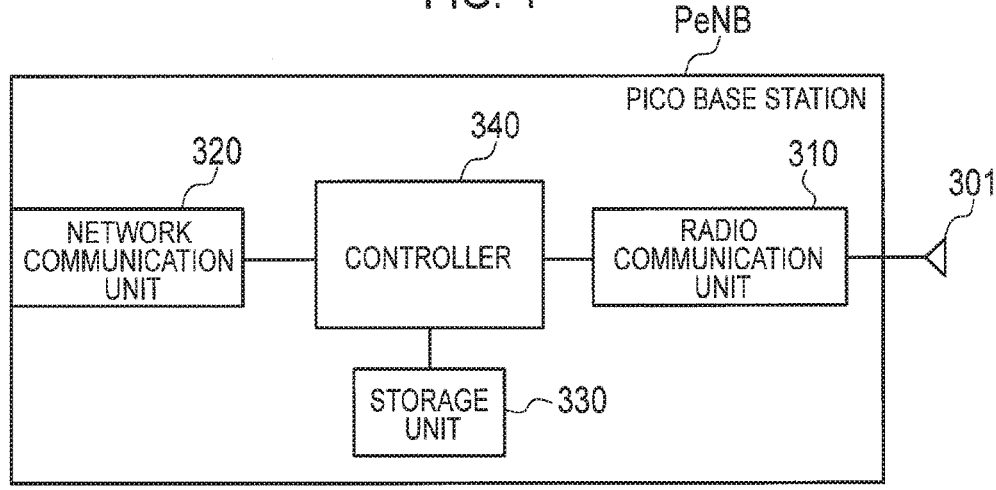

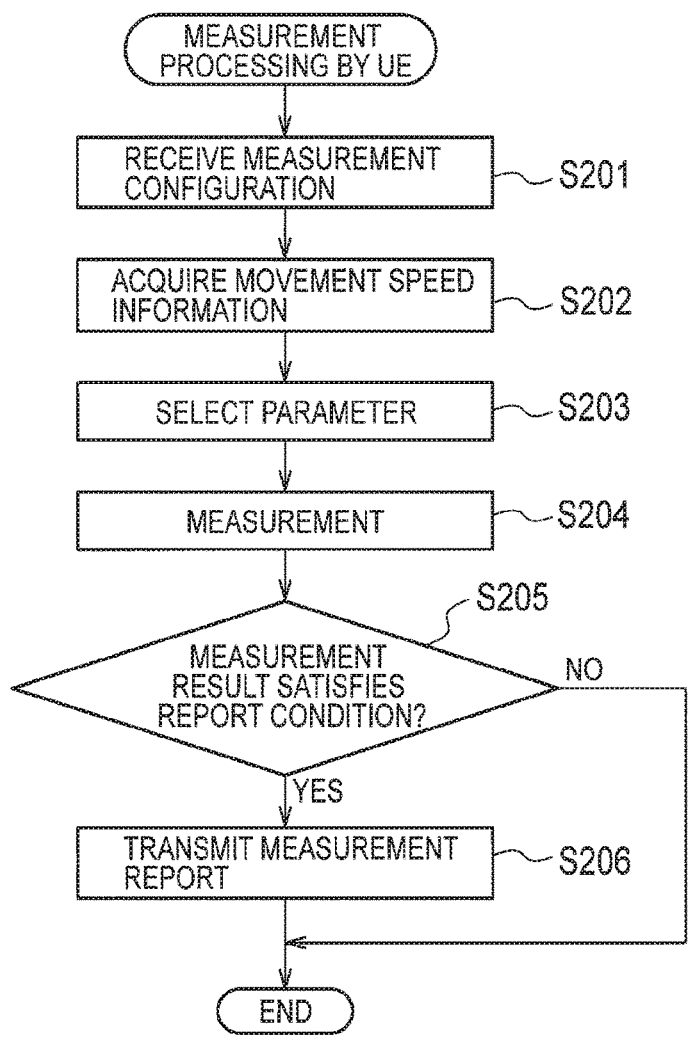

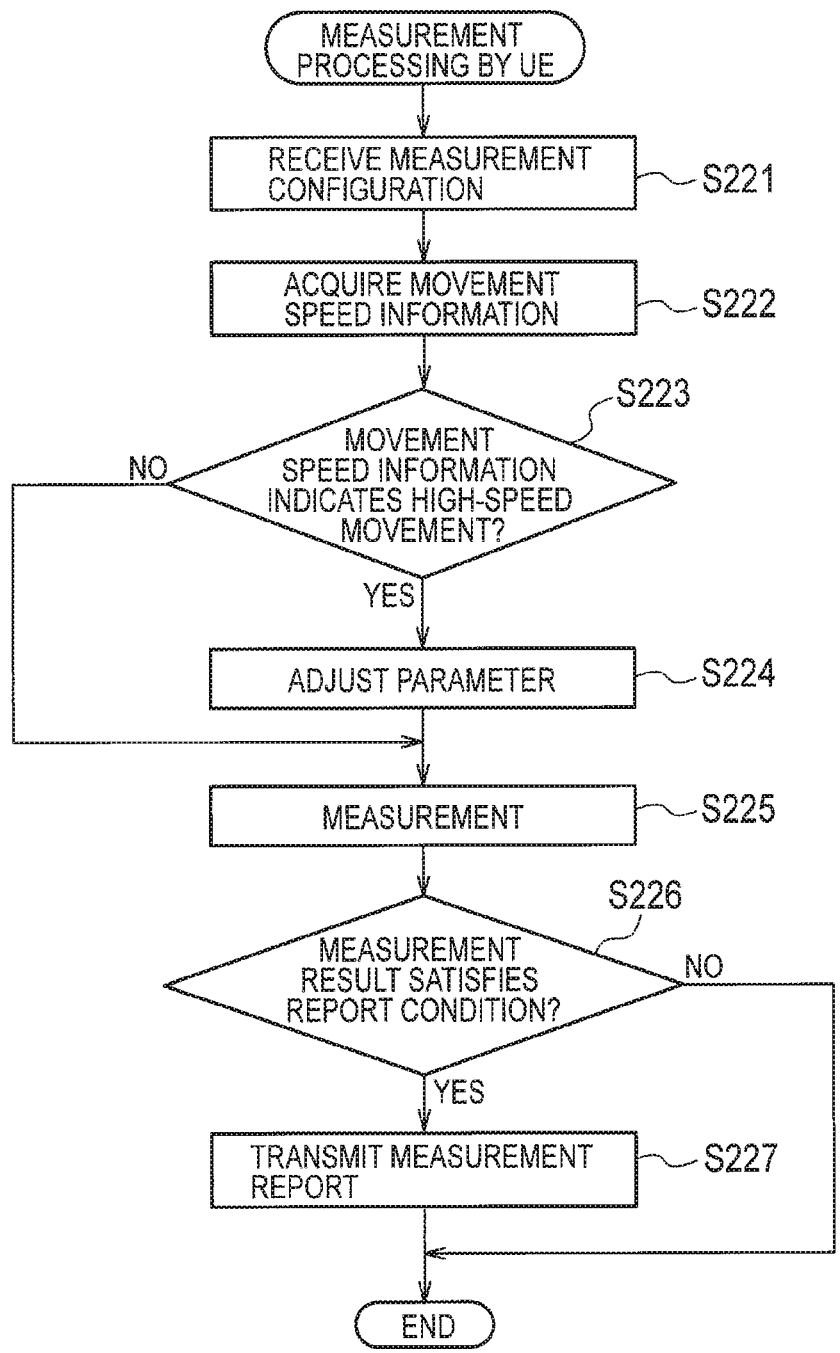

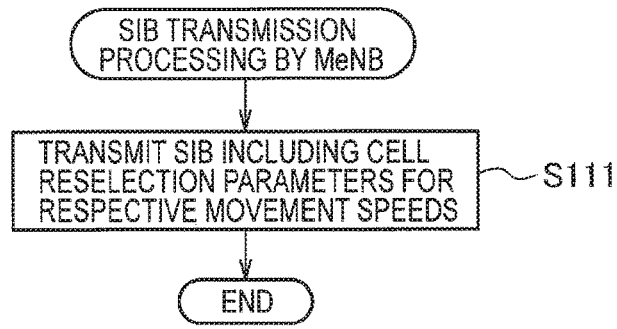
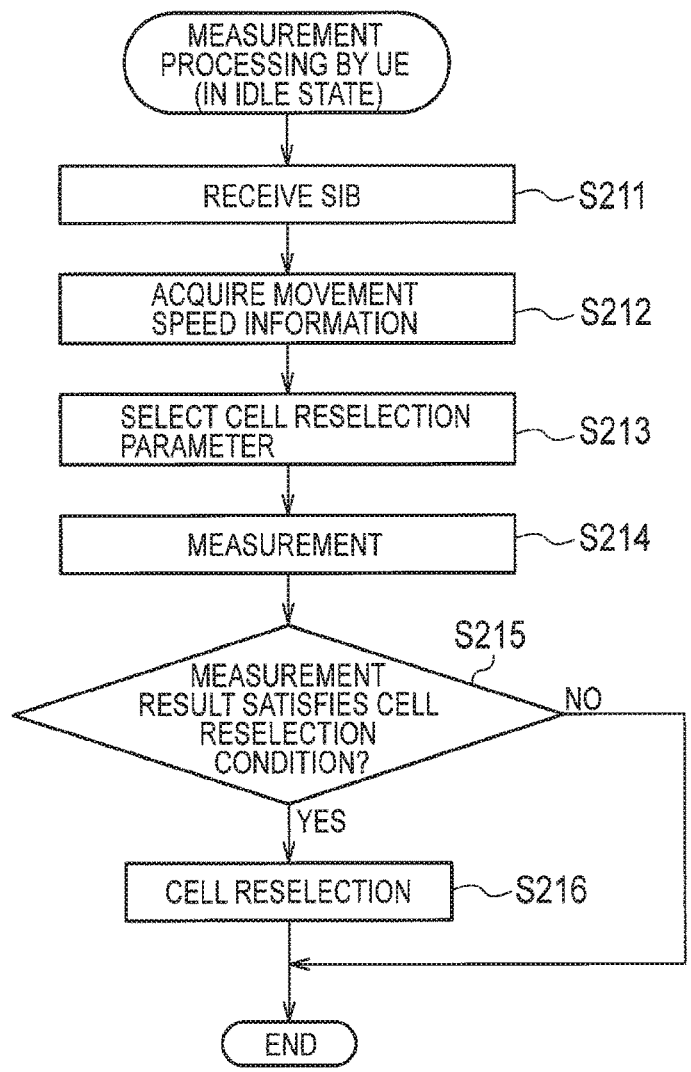

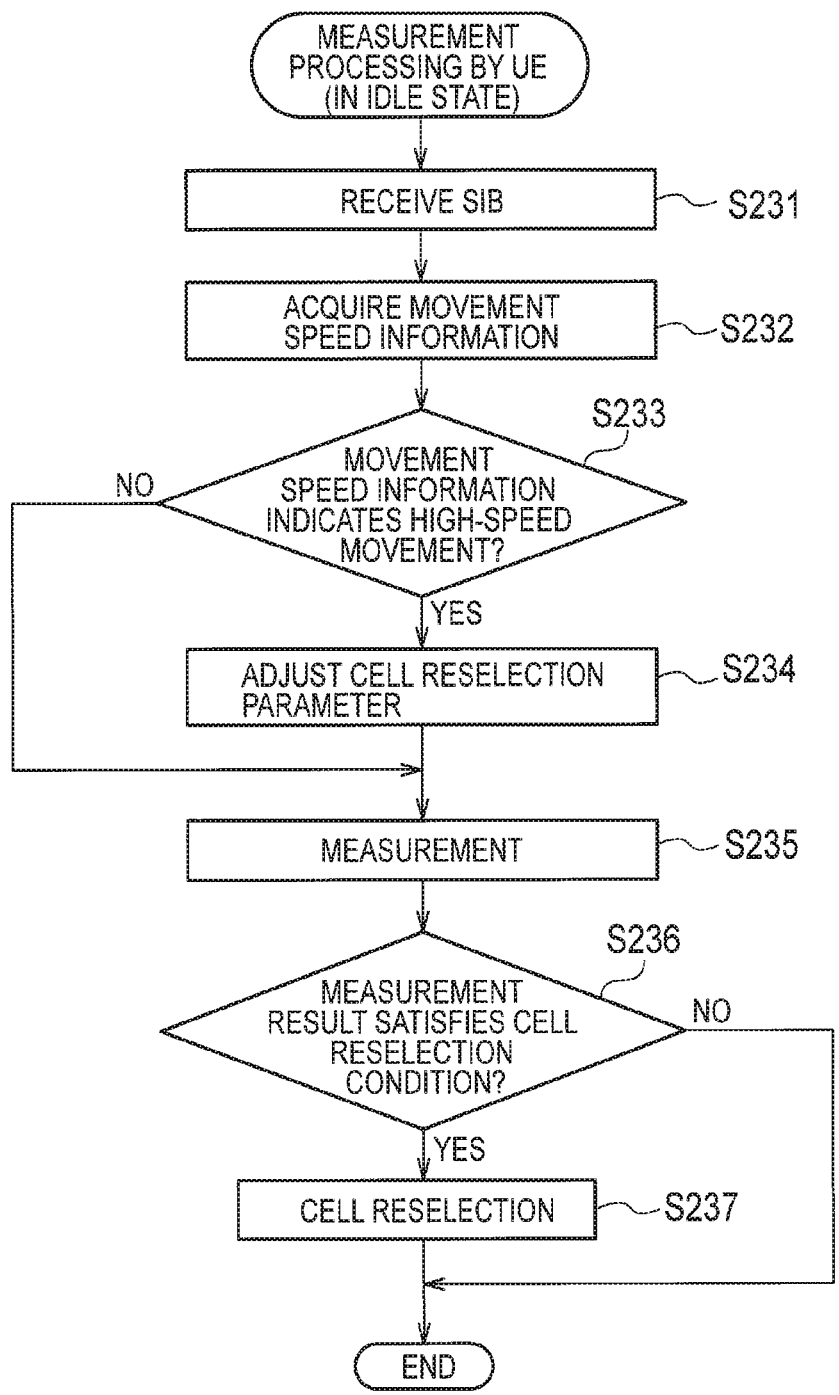

MOBILE COMMUNICATION METHOD

CROSS REFERENCE TO RELATED APPLICATIONS

This application is a continuation of U.S. patent application Ser. No. 14/249,287, filed Apr. 9, 2014, which is a continuation of U.S. patent application Ser. No. 13/438,561, filed Apr. 3, 2012, which claims the benefit of U.S. Provisional Patent Application No. 61/471,304 filed on Apr. 4, 2011; the entire contents of which are incorporated herein by reference.

BACKGROUND OF THE INVENTION

1. Field of the Invention

The present invention relates to a mobile communication method, a base station, a radio terminal, and a low-power base station, which are used for a heterogeneous network.

2. Description of the Related Art

As a next-generation mobile communication system achieving communications with a higher-speed and larger-capacity, standardizations of LTE (Long Term Evolution) Advanced are in progress by the 3GPP (3rd Generation Partnership Project) which is a standardization organization thereof.

A network of the LTE Advanced under consideration for provision is a heterogeneous network in which a low-power base station with a small cell (a service area range) is effectively deployed in addition to a high-power base station (so-called, a macro base station). This low-power base station includes a so-called pico base station, femto base station, relay node, and the like.

In the heterogeneous network, a load of a high-power base station can be distributed to a low power base station, so that a service quality provided to a radio terminal can be improved. However, including cells with different sizes, the heterogeneous network necessitates a technology that can improve a service quality for a moving radio terminal (see, 3GPP contributed article, RP-110438, New work item proposal for Hetnet Mobility Improvements for LTE).

SUMMARY OF THE INVENTION

Regarding movement of a radio terminal, a heterogeneous network has the following problem.

When a radio terminal moving at a high speed switches a connected base station (or a base station connected for stand-by) to a low-power base station, the radio terminal has to immediately switch to another base station because the cell of the low-power base station is small.

Accordingly, the problem is to consequently waste a resource consumed to switch to the low-power base station and a resource consumed to switch from the low-power base station to another base station.

For this reason, an object of the present invention is to provide a mobile communication method, a base station, a radio terminal, and a low-power base station, which can prevent unnecessary switching between base stations in a heterogeneous network from consuming resources.

The present invention has the following features to solve the problems described above.

First of all, a mobile communication method according to a first feature of the present invention is summarized as follows. The mobile communication method comprises the steps of: notifying (S101 or S111), by a base station (macro base station MeNB) connected to a radio terminal (radio terminal UE) for communications or stand-by, the radio terminal of a plurality of parameters including a first parameter for high-speed movement and a second parameter for non-high-speed movement as parameters for processing for switching to any of neighboring base stations; acquiring (S202 or S212), by the radio terminal, movement speed information indicating a movement speed of the radio terminal; and selecting (S203 or S213), by the radio terminal, a parameter corresponding to the movement speed information from the plurality of parameters notified by the base station, wherein the first parameter is configured to inhibit processing for switching to a low-power base station (pico base station PeNB) which is included in the neighboring base stations.

A base station according to a first feature of the present invention is summarized as follows. The base station (macro base station MeNB) to be connected to a radio terminal (radio terminal UE) for communications or stand-by, comprises: a notification unit (radio communication unit 110 and controller 140) configured to notify the radio terminal of a plurality of parameters including a first parameter for high-speed movement and a second parameter for non-high-speed movement as parameters for processing for switching to any of neighboring base stations, wherein the first parameter is configured to inhibit processing for switching to a low-power base station (pico base station PeNB) which is included in the neighboring base stations.

A radio terminal according to a first feature of the present invention is summarized as follows. The radio terminal (radio terminal UE) in a mobile communication system, comprises: a receiver (radio communication unit 210) configured to receive a plurality of parameters including a first parameter for high-speed movement and a second parameter for non-high-speed movement as parameters for processing for switching to a neighboring base station from a base station (macro base station MeNB) connected to the radio terminal for communications or stand-by; an acquisition unit (controller 260) configured to acquire movement speed information indicating a movement speed of the radio terminal; and a selector (controller 260) configured to select a parameter corresponding to the movement speed information from the plurality of parameters received by the receiver, wherein the first parameter is configured to inhibit processing for switching to a low-power base station (pico base station PeNB) which is included in the neighboring base stations.

A mobile communication method according to a second feature of the present invention is summarized as follows. The mobile communication method comprises the steps of: notifying (S221 or S231), by a base station (macro base station MeNB) connected to a radio terminal (radio terminal UE) for communications or stand-by, the radio terminal of a parameter for processing for switching to a neighboring base station; acquiring (S222 or S232), by the radio terminal, movement speed information indicating a movement speed of the radio terminal; and adjusting (S224 or S234), by the radio terminal, the parameter notified by the base station on the basis of the movement speed information, wherein the radio terminal adjusts the parameter notified by the base station to inhibit processing for switching to a low-power base station (pico base station PeNB) which is included in the neighboring base stations when the movement speed information indicates high-speed movement.

A radio terminal according to a second feature of the present invention is summarized as follows. The radio terminal (radio terminal UE) in a mobile communication system, comprising: a receiver (radio communication unit 210) configured to receive a parameter for processing for switching to any of neighboring base stations from a base station (macro base station MeNB) connected to the radio terminal for communications or stand-by; an acquisition unit (controller 260) configured to acquire movement speed information indicating a movement speed of the radio terminal; and an adjustment unit (controller 260) configured to adjust the parameter received by the receiver on the basis of the movement speed information, wherein the adjustment unit adjusts the parameter received by the receiver to inhibit processing for switching to a low-power base station (pico base station PeNB) which is included in the neighboring base station when the movement speed information indicates high-speed movement.

A mobile communication method according to a third feature of the present invention is summarized as follows. The mobile communication method comprising the steps of: acquiring (S121), by a base station (macro base station MeNB) connected to a radio terminal (radio terminal UE), movement speed information indicating a movement speed of the radio terminal; selecting (S122), by the base station, a parameter corresponding to the movement speed information from a plurality of parameters including a first parameter for high-speed movement and a second parameter for non-high-speed movement as parameters for processing for handover to any of neighboring base stations; and notifying (S123), by the base station, the radio terminal of the parameter selected in the selecting step, wherein the first parameter is configured to inhibit processing for handover to a low-power base station (pico base station PeNB) which is included in the neighboring base stations.

A base station according to a third feature of the present invention is summarized as follows. The base station (macro base station MeNB) to be connected to a radio terminal (radio terminal UE), comprising: an acquisition unit (controller 140) configured to acquire movement speed information indicating a movement speed of the radio terminal; a selector (controller 140) configured to select a parameter corresponding to the movement speed information from a plurality of parameters including a first parameter for high-speed movement and a second parameter for non-high-speed movement as parameters for processing for handover to any of neighboring base stations; and a notification unit (radio communication unit 110 and controller 140) configured to notify the radio terminal of the parameter selected by the selector, wherein the first parameter is configured to inhibit processing for handover to a low-power base station (pico base station PeNB) which is included in the neighboring base stations.

A mobile communication method according to a fourth feature of the present invention is summarized as follows. The mobile communication method comprising the steps of: reporting (S401), from a radio terminal (radio terminal UE) to a base station connected to the radio terminal, measurement information on a measurement result of a received signal from at least one of the base station and each neighboring base station; acquiring (S404), by the base station, movement speed information indicating a movement speed of the radio terminal; and transmitting (S406), from the base station to a low-power base station (pico base station PeNB), a handover request for requesting an admission of the radio terminal when the measurement information reported from the radio terminal satisfies a handover condition to the low-power base station which is included in the neighboring base stations, wherein the base station halts (S407) transmission of the handover request to the low-power base station when the measurement information reported from the radio terminal satisfies the handover condition to the low-power base station and the movement speed information indicates high-speed movement.

In the mobile communication method according to a fourth feature of the present invention, the method further comprises the step of instructing (S408), by the base station, the radio terminal to halt processing for a measurement of a received signal from the low-power base station when the movement speed information indicates high-speed movement.

A base station according to a fourth feature of the present invention is summarized as follows. The base station (macro base station MeNB) to be connected to a radio terminal (radio terminal UE), comprising: a receiver (radio communication unit 110) configured to receive measurement information on a measurement result of a received signal from at least one of the base station and each neighboring base station from the radio terminal; an acquisition unit (controller 140) configured to acquire movement speed information indicating a movement speed of the radio terminal; and a transmitter (network communication unit 120 and controller 140) configured to transmit a handover request for requesting an admission of the radio terminal to a low-power base station (pico base station PeNB) when the measurement information received by the receiver satisfies a handover condition to the low-power base station, wherein, when the measurement information reported from the radio terminal satisfies the handover condition for handover to the low-power base station and when the movement speed information indicates high-speed movement, the transmitter halts transmission of the handover request to the low-power base station.

A mobile communication method according to a fifth feature of the present invention is summarized as follows. The mobile communication method comprising the steps of: reporting (S411), from a radio terminal (radio terminal UE) to a base station (macro base station MeNB) connected to the radio terminal, measurement information on a measurement result of a received signal from at least one of the base station and each neighboring base station; acquiring (S413), by the base station, movement speed information indicating a movement speed of the radio terminal; and transmitting (S417), from the base station to a low-power base station (pico base station PeNB) which is included in the neighboring base stations, a handover request for requesting an admission of the radio terminal on the basis of the measurement information reported from the radio terminal, wherein the base station transmits (S415) the handover request including high-speed movement information when the movement speed information indicates high-speed movement.

In the mobile communication method according to the fifth feature of the present invention, the method further comprises the steps of: receiving (S601) the handover request by the low-power base station: and rejecting (S603) the handover request by the low-power base station when the handover request includes the high-speed movement information. The rejection of the handover request means transmitting negative acknowledgement (NACK) in response to the handover request, or refers to disregarding and not responding to the handover request. This meaning is similar in follows.

In the mobile communication method according to the fifth feature of the present invention, the method may further comprise the step of instructing (S416), by the base station, the radio terminal to halt processing for a measurement of a received signal from the low-power base station when the movement speed information indicates high-speed movement.

A base station according to a fifth feature of the present invention is summarized as follows. The base station (macro base station MeNB) to be connected to a radio terminal (radio terminal UE) comprises: a receiver (radio communication unit 110) configured to receive measurement information on a measurement result of a received signal from at least one of the base station and each neighboring base station from the radio terminal; an acquisition unit (controller 140) configured to acquire movement speed information indicating a movement speed of the radio terminal; and a transmitter (network communication unit 120 and controller 140) configured to transmit a handover request for requesting an admission of the radio terminal to a low-power base station (pico base station PeNB) which is included in the neighboring base stations on the basis of the measurement information received by the receiver, wherein the transmitter transmits the handover request including high-speed movement information when the movement speed information indicates high-speed movement.

A low-power base station according to a fifth feature of the present invention is summarized as follows. The low-power base station (pico base station PeNB) comprises: a receiver (network communication unit 320) configured to receive a handover request for requesting an admission of a radio terminal (radio terminal UE) from a neighboring base station; and a transmitter (network communication unit 320 and controller 340) configured to transmit a response to the handover request to the neighboring base station, wherein the low-power base station rejects the handover request when the handover request includes high-speed movement information indicating that the radio terminal is moving at a high speed.

A mobile communication method according to a sixth feature of the present invention is summarized as follows. The mobile communication method comprising the steps of: receiving (S611), by a low-power base station (pico base station PeNB), a handover request for requesting an admission of a radio terminal (radio terminal UE) from a neighboring base station; requesting (S614), by the low-power base station, a core network (EPC) for movement speed information indicating a movement speed of the radio terminal; acquiring (S615), by the low-power base station, the movement speed information from the core network; and transmitting (S617), from the low-power base station to the neighboring base station, a response to the handover request, wherein the low-power base station rejects (S613) the handover request when the movement speed information from the core network indicates high-speed movement.

A low-power base station according to a sixth feature of the present invention is summarized as follows. The low-power base station (pico base station PeNB) comprising: a receiver (network communication unit 320) configured to receive a handover request for requesting an admission of a radio terminal (radio terminal UE) from a neighboring base station; an acquisition unit (network communication unit 320 and controller 340) configured to acquire movement speed information from a core network (EPC) after requesting the core network for the movement speed information indicating a movement speed of the radio terminal; and a transmitter (network communication unit 320 and controller 340) configured to transmit a response to the handover request to the neighboring base station, wherein the low-power base station rejects the handover request when the movement speed information from the core network indicates high-speed movement.

A mobile communication method according to a seventh feature of the present invention is summarized as follows. The mobile communication method comprises the steps of: measuring (S242), by a radio terminal (radio terminal UE), a received signal from at least one of a base station (macro base station MeNB) connected to the radio terminal and each neighboring base station: acquiring (S245), by the radio terminal, movement speed information indicating a movement speed of the radio terminal; and reporting (S244), from the radio terminal to the base station, measurement information on a measurement result obtained in the measuring step, wherein, when predetermined measurement information on a measurement result of a received signal from a low-power base station (pico base station PeNB) is obtained by the measurement and when the movement speed information indicates high-speed movement, the radio terminal reports (S247) the measurement information from which the predetermined measurement information is excluded.

A radio terminal according to a seventh feature of the present invention is summarized as follows. The radio terminal (radio terminal UE) in a mobile communication system, comprises: a measurement unit (radio communication unit 210 and controller 260) configured to measure a received signal from at least one of a base station (macro base station MeNB) connected to the radio terminal and each neighboring base station; an acquisition unit (controller 260) configured to acquire movement speed information indicating a movement speed of the radio terminal; and a reporting unit (radio communication unit 210 and controller 260) configured to report measurement information on a measurement result obtained by the measurement unit to the base station, wherein, when predetermined measurement information on a measurement result of a received signal from a low-power base station (pico base station PeNB) is obtained by the measurement and when the movement speed information indicates high-speed movement, the reporting unit reports the measurement information from which the predetermined measurement information is excluded.

A mobile communication method according to an eighth feature of the present invention is summarized as follows. The mobile communication method comprises the steps of: receiving (S421), by a base station (macro base station MeNB) connected to a radio terminal (radio terminal UE), measurement information on a measurement result of a received signal from at least one of the base station and each neighboring base station from the radio terminal; acquiring (S423), by the base station, movement speed information indicating a movement speed of the radio terminal; and determining (S426), by the base station, a handover target of the radio terminal on the basis of the measurement information received from the radio terminal, wherein, when predetermined measurement information on a measurement result of a received signal from a low-power base station (pico base station PeNB) is included in the measurement information and when the movement speed information indicates high-speed movement, the base station decides the handover target of the radio terminal after excluding (S425) the predetermined measurement information which is included in the measurement information.

A base station according to an eighth feature of the present invention is summarized as follows. The base station (macro base station MeNB) to be connected to a radio terminal (radio terminal UE), comprises: a receiver (radio communication unit 110) configured to receive measurement information on a measurement result of a received signal from at least one of the base station and each neighboring base station from the radio terminal; an acquisition unit (controller 140) configured to acquire movement speed information indicating a movement speed of the radio terminal; and a decision unit (controller 140) configured to decide a handover target of the radio terminal on the basis of the measurement information received by the receiver, wherein, when predetermined information on a measurement result of a received signal from a low-power base station (pico base station PeNB) is included in the measurement information and when the movement speed information indicates high-speed movement, the decision unit decides the handover target of the radio terminal after excluding the predetermined measurement information which is included in the measurement information.

The present invention can provide a mobile communication method, a base station, a radio terminal, and a low power base station which can prevent unnecessary switching between base stations in a heterogeneous network from consuming resources.

BRIEF DESCRIPTION OF THE DRAWINGS

FIG. 2 is a block diagram of a macro base station according to the first to eighth embodiments.

FIG. 3 is a block diagram of a radio terminal according to the first to eighth embodiments.

FIG. 4 is a block diagram of a pico base station according to the first to eighth embodiments.

FIG. 7 is a flowchart of measurement configuration transmission processing according to the first embodiment;

FIG. 8 is a flowchart of measurement processing according to the first embodiment.

FIG. 9 is a flowchart of measurement processing according to the second embodiment.

FIG. 18 is an operational flowchart of the macro base station when the first embodiment is applied to the cell reselection.

FIG. 19 is an operational flowchart of the radio terminal when the first embodiment is applied to the cell reselection.

FIG. 20 is an operational flowchart of the radio terminal when the second embodiment is applied to the cell reselection.

DESCRIPTION OF THE EMBODIMENTS

Figure 1:
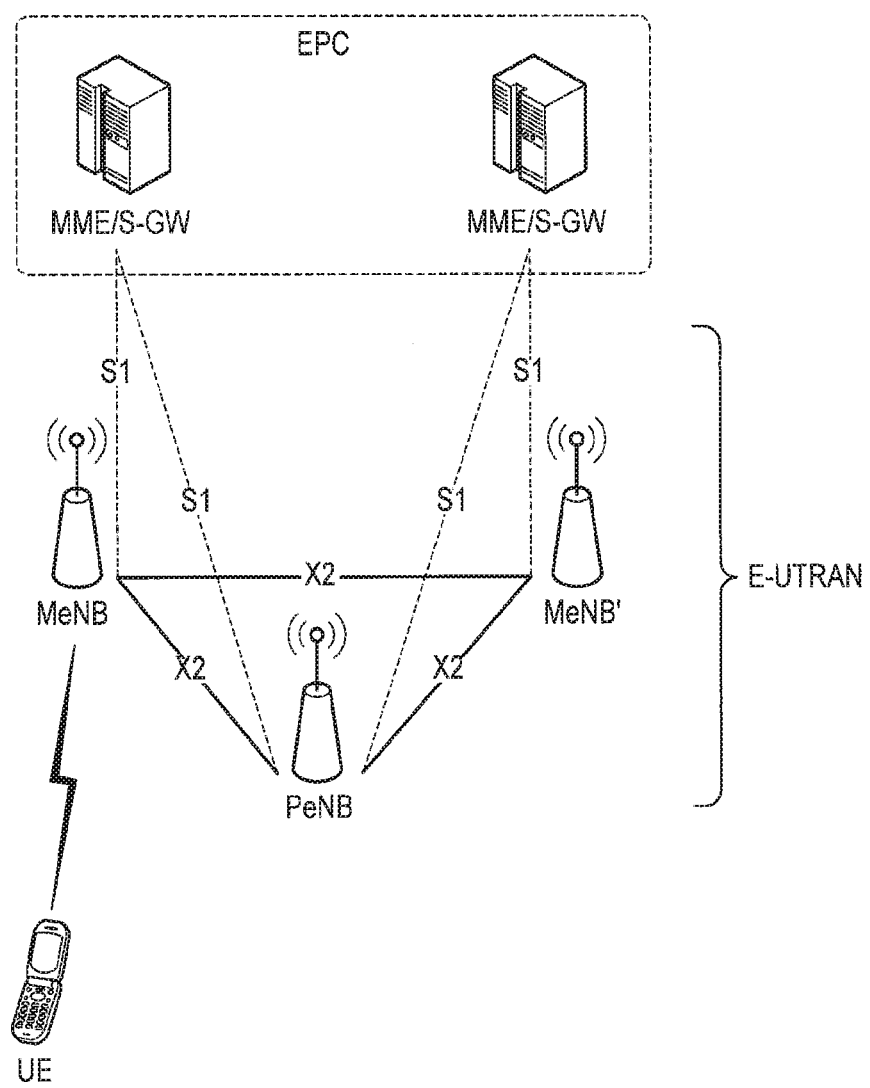
FIG. 1 is a drawing for describing a network configuration of a mobile communication system according to first to eighth embodiments.

Referring to the drawings, first to eighth embodiments and other embodiments of the present invention are described. In the drawings in each embodiment, same or similar reference numerals are given to denote same or similar portions.

Summary of Embodiments

A mobile communication system according to the first to eighth embodiments is configured based on LTE whose specifications are designed by the 3GPP. Also, a heterogeneous network is introduced into the mobile communication system. As described above, the heterogeneous network includes not only a high-power base station (so-called, a macro base station) but also a low-power base station with a small cell, which are effectively deployed in the network (for example, located in a high-traffic area). In the first to eighth embodiments, a pico base station which is one type of a low-power base station is described as an example.

FIG. 1 is a drawing for illustrating a network configuration of the mobile communication system.

As shown in FIG. 1, the mobile communication system includes a radio terminal UE, a macro base station MeNB, a pico cell base station PeNB, a macro base station MeNB', a mobility management device MME, and a gateway device S-GW. In the following description, when the macro base station MeNB and the Pico base station PeNB are not particularly distinguished from each other, they are simply referred to as a "base station eNB".

The radio terminal UE is a radio communication device which is held by a user and moves along with the movement of the user. The radio terminal UE connects with any of multiple base stations eNB to perform communications via the connected base station eNB. A state where the radio terminal UE is communicating is referred to as a connected state (or a connected mode), while a state where the radio terminal UE is in standby without executing a communication is referred to as an idle state (or an idle mode).

The plurality of base stations eNB forms E-UTRAN (Evolved-UMTS Terrestrial Radio Access Network) which is a radio access network. Each of the plurality of base stations eNB forms a cell in which the radio terminal UE is provided with a service. The cell which is formed by each base station eNB forms a wide-range service area. Each of the plurality of base stations eNB constantly broadcasts a reference signal (RS) with which the base station can be identified. Such a reference signal is sometimes referred to as a pilot signal.

The radio terminal UE switches to a base station eNB with a more preferable radio condition as it moves. Such base station switching is referred to as handover in the connected state and as a cell reselection in the idle state. In the mobile communication system, a base station eNB connected to the radio terminal UE has rights to decide whether to handover the radio terminal UE and to decide a handover target.

The neighboring base stations eNB can perform base station communications using an X2 interface which is a logical interface. Each base station eNB transmits/receives a control signal which is used for handover control or the like, using the X2 interface.

The mobility management device MME and the gateway device S-GW form EPC (Evolved Packet Core) which is a core network. Each base station eNB communicates with the mobility management device MME and the gateway device S-GW which are included in EPC, using an S1 interface which is a logical interface for communication with EPC. The mobility management device MME executes a control plane function for enabling mainly user authentication, paging, interconnection with other systems, and the like and transmits/receives a control signal to/from each base station eNB. On the other hand, the gateway device S-GW executes a user plane function for transferring user data and transmits/receives a data packet to/from each base station eNB.

Hereinafter, referring to FIGS. 2 to 4, respective configurations of the macro base station MeNB, the radio terminal UE, and the pico base station PeNB are described.

FIG. 2 is a functional block configuration diagram of the macro base station MeNB. As shown in FIG. 2, the macro base station MeNB includes an antenna 101, a radio communication unit 110, a network communication unit 120, a storage unit 130, and a controller 140.

The antenna 101 is used for transmission and reception of a radio signal. The radio communication unit 110 is configured to perform a radio communication through the antenna 101. As for transmission, the radio communication unit 110 performs up-convert and amplification of a baseband signal which is inputted from the controller 140 and outputs a radio signal through the antenna 101. As for reception, the radio communication unit 110 performs amplification and down-convert of a received signal which is inputted from the antenna 101 and, thereafter, outputs a baseband signal to the controller 140.

The network communication unit 120 communicates with the core network EPC and neighboring base stations. Specifically, the network communication unit 120 communicates with the gateway device S-GW and the mobility management device MME which are included in the core network EPC, using the S1 interface. Also, the network communication unit 120 communicates with the pico base station PeNB and the macro base station MeNB', using the X2 interface.

The storage unit 130 is configured using, for example, a memory, and stores various pieces of information to be used for control which is performed by the controller 140 and the like. The controller 140 is configured using, for example, a CPU and controls various kinds of functions included in the macro base station MeNB.

FIG. 3 is a block configuration diagram of the radio terminal UE. As shown in FIG. 3, the radio terminal UE includes an antenna 201, a radio communication unit 210, a user interface unit 220, a GPS receiver 230, a battery 240, a storage unit 250, and a controller 260. However, the radio terminal UE does not necessarily includes the GPS receiver 230. Also, the radio terminal UE configured as, for example, a card-type terminal, does not include the user interface unit 220 and the battery 240.

The antenna 201 is used for transmission and reception of a radio signal. The radio communication unit 210 is configured so as to perform a radio communication through the antenna 201. As for transmission, the radio communication unit 210 performs up-convert and amplification of a baseband signal which is inputted from the controller 260 and outputs a radio signal through the antenna 201. As for reception, the radio communication unit 210 performs amplification and down-convert of a received signal which is inputted through the antenna 201 and, thereafter, outputs a baseband signal to the controller 260.

The user interface unit 220 includes a button to accept an operation from a user and a display to display an image, and functions as an interface with the user of the radio terminal UE. The GPS receiver 230 receives a GPS signal and outputs location information indicating a current location of the radio terminal UE to the controller 260. The battery 240 stores power which is supplied to each block of the radio terminal UE. The storage unit 250 is configured using, for example, a memory, and stores various pieces of information to be used for control performed by the controller 260 and the like. The controller 260 is configured using, for example, a CPU and controls various kinds of functions included in the radio terminal UE.

FIG. 4 is a block configuration diagram of the pico base station PeNB. As shown in FIG. 4, the pico base station PeNB includes an antenna 301, a network communication unit 320, a storage unit 330, and a controller 340.

The antenna 301 is used for transmission and reception of a radio signal. The radio communication unit 310 is configured so as to perform a radio communication through the antenna 301. As for transmission, the radio communication unit 310 performs up-convert and amplification of a baseband signal which is inputted from the controller 340 and outputs a radio signal through the antenna 301. As for reception, the radio communication unit 310 performs amplification and down-convert of a received signal which is inputted through the antenna 301 and, thereafter, outputs a baseband signal to the controller 340.

The network communication unit 320 communicates with the core network EPC and neighboring base stations. Specifically, the network communication unit 320 communicates with the gateway device S-GW and the mobility management device MME which are included in the core network EPC, using the S1 interface. Also, the network communication unit 320 communicates with the macro base station MeNB and the macro base station MeNB', using the X2 interface.

The storage unit 330 is configured using, for example, a memory, and stores various pieces of information to be used for control performed by the controller 340 and the like. The controller 340 is configured using, for example, a CPU and controls various kinds of functions included in the pico base station PeNB.

Figure 5:
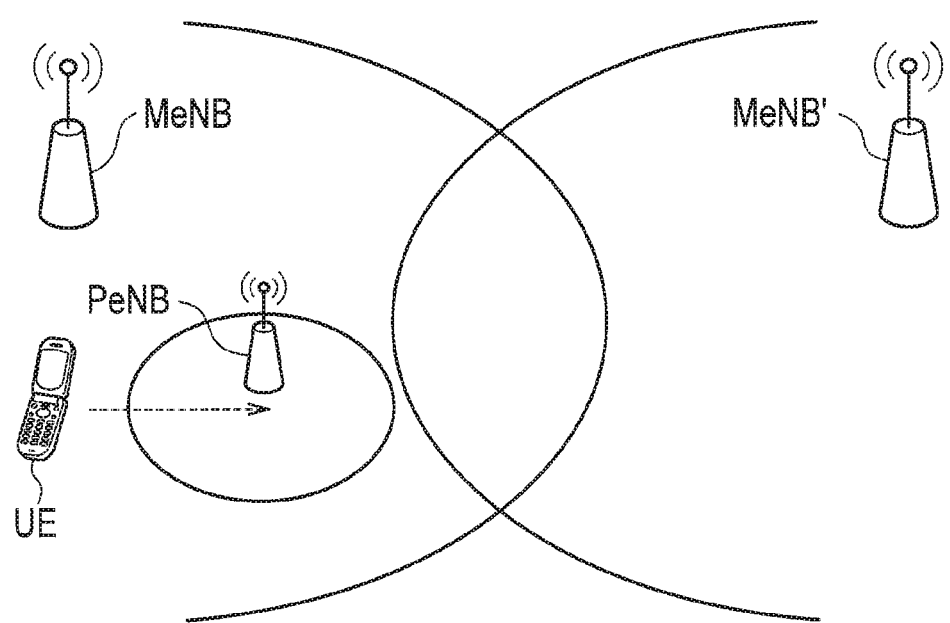
FIG. 5 is a drawing for describing an operation environment of the mobile communication system according to the first to eighth embodiments.

Hereinafter, an operation environment of the mobile communication system is described. FIG. 5 is a drawing for describing an operation environment of the mobile communication system.

As shown in FIG. 5, in the mobile communication system, the pico base station PeNB is located in the neighborhood of the macro base station MeNB within a cell which is formed by the macro base station MeNB. The Macro base station MeNB' is located in the neighborhood of the macro base station MeNB outside the cell which is formed by the macro base station MeNB. In other words, the pico base station PeNB and the macro base station MeNB' correspond to neighboring base stations in the neighborhood of the macro base station MeNB.

The radio terminal UE is located within the cell of the macro base station MeNB and is connected to and communicates with the macro base station MeNB. Also, the radio terminal UE is moving toward a cell of the pico base station PeNB.

Figure 6:
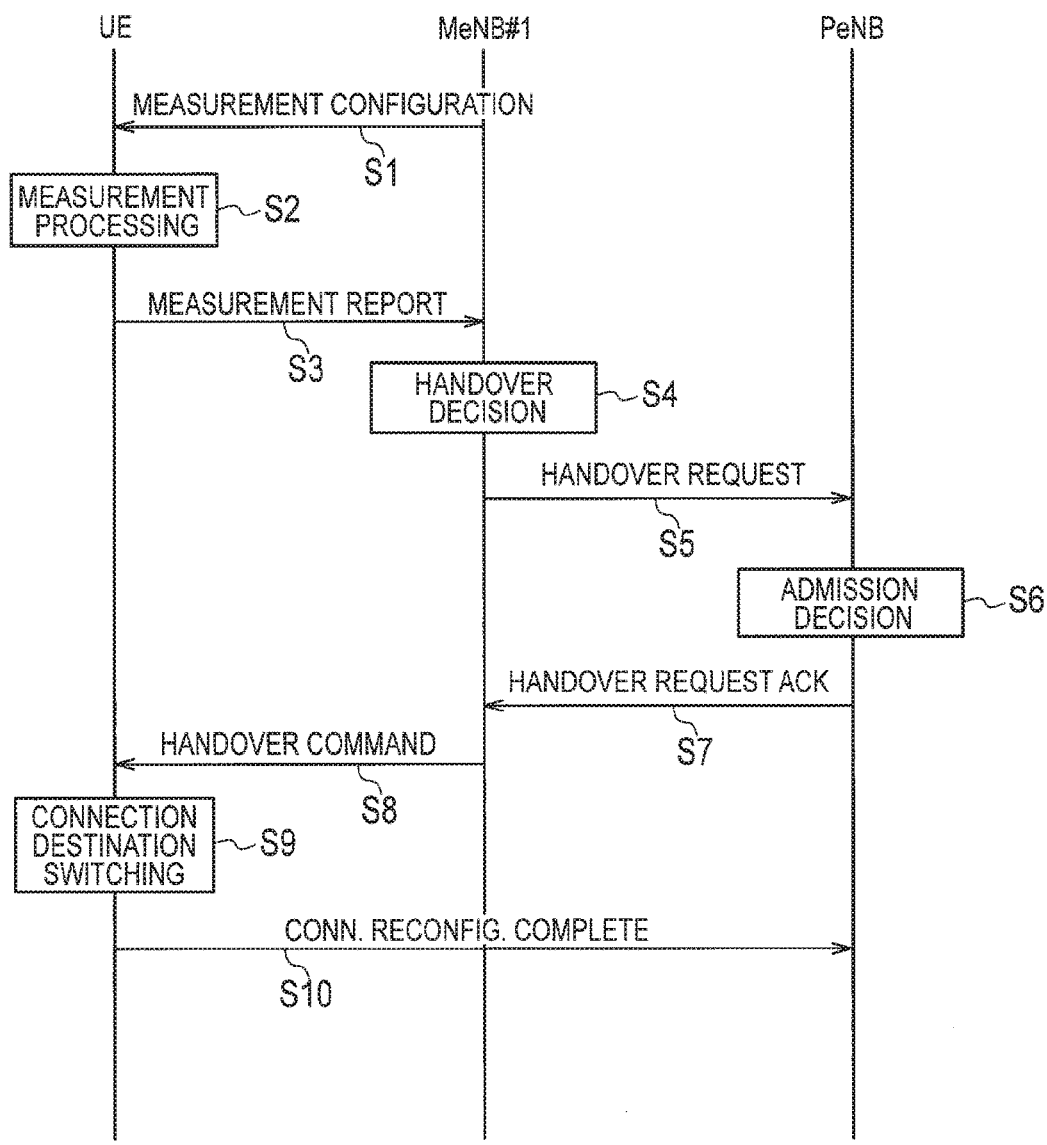
FIG. 6 is an operational sequence diagram of handover procedures from the macro base station to the pico base station.

Here, the description is given on an outline of handover procedures in the handover from the macro base station MeNB to the pico base station PeNB in the mobile communication system. FIG. 6 is an operational sequence diagram of the handover procedures from the macro base station MeNB to the pico base station PeNB.

As shown in FIG. 6, at step S1, the macro base station MeNB transmits a measurement configuration for configuring measurement and reporting of a measurement result, which should be performed by the radio terminal UE, to the radio terminal UE. The measurement means, for example, measurement of reference signal received power (RSRP) or a reference signal received quality (RSRQ). The measurement configuration includes a parameter for controlling the measurement and reporting of the measurement result which should be performed by the radio terminal UE.

The parameter includes a measurement target and a reporting condition. The measurement target is designated with a measurement ID for each base station (a cell), for example. The reporting condition includes information designating a periodic report or an event-triggered report, or information indicating a designated event (in other words, a reporting condition) in the case of the event-triggered report.

The reporting condition includes a condition that a measurement value (RSRP/RSRQ) of a neighboring base station (a neighboring cell) becomes higher than a value obtained by adding an offset to the measurement value of the macro base station MeNB (the serving cell), a condition that RSRP/RSRQ of the macro base station MeNB becomes lower than a threshold, and a condition that a RSRP/RSRQ of the neighboring base station exceeds a threshold. Note that in the event-triggered report, an overhead can be reduced as compared with the periodic report.

At step S2, the radio terminal UE decides whether to report the measurement result after the measurement is conducted according to the parameter included in the measurement configuration. In the case of the periodic report, the decision is conducted depending on whether a timer has expired, while in the case of the event-triggered report, the decision is conducted depending on whether a timer has expired after the reporting condition is satisfied.

At step S3, the radio terminal UE transmits a measurement ID of a base station (a cell) which is a target for measurement and a measurement report including the measurement information which is configured in association with the measurement result to the macro base station MeNB. Specifically, in the case of the periodic report, the measurement information for each measurement ID is included in the measurement report, while in the case of the event-triggered report, only the measurement information for the measurement ID corresponding to the reporting condition is included in the measurement report.

At step S4, the macro base station MeNB decides whether to perform a handover on the basis of the measurement report received from the radio terminal UE. When it is decided to perform the handover, the macro base station MeNB decides a handover target. It is assumed here that the handover to the pico base station PeNB is decided to be performed.

At step S5, the macro base station MeNB transmits a handover request for requesting admission of the radio terminal UE to the pico base station PeNB, using the X2 interface.

At step S6, the pico base station PeNB decides whether to permit the admission of the radio terminal UE on the basis of the handover request received from the macro base station MeNB. For example, the admission can be decided to be rejected when the pico base station PeNB is in a high-load state. It is assumed here that the admission of the radio terminal UE is permitted.

At step S7, the pico base station PeNB transmits a handover request Ack which is an affirmative response to the handover request to the macro base station MeNB, using the X2 interface.

At step S8, the macro base station MeNB transmits a handover command for instructing the handover in response to the reception of the handover request Ack from the pico base station eNB, to the radio terminal.

At step S9, the radio terminal UE disconnects from the macro base station MeNB in response to the reception of the handover command from the macro base station MeNB and establishes the connection (establishes synchronization) with the pico base station PeNB.

At step S10, the radio terminal UE transmits a Conn. Reconfig. Complete for notifying that switching of the connected base station has been completed to the pico base station PeNB.

The handover from the macro base station MeNB to the pico base station PeNB is performed with these procedures. However, there are a number of communications (signaling) of the control signal along with the handover. Thus, a large amount of resources is consumed.

As shown in FIG. 5, the radio terminal UE which moves to a vicinity of the pico base station PeNB can execute handover to the pico base station PeNB with the above-described handover procedures.

However, when the radio terminal UE is moving at a high speed because the radio terminal UE is on a vehicle, for example, there is a need to perform handover from the pico base station PeNB to the macro base station MeNB' just after the handover to the pico base station PeNB is performed. Accordingly, the resource which is consumed for the handover to the pico base station PeNB and the resource which is consumed for the handover from the pico base station PeNB to the macro base station MeNB' are wasted as a result.

For this reason, the first to eighth embodiments to be described below solve a problem of a heterogeneous network which is caused by a high-speed movement of the radio terminal UE by improving the above-described handover procedures.

First Embodiment

In the first embodiment, the measurement configuration transmission processing (step S1 in FIG. 6) and the measurement processing (step S2 in FIG. 6) in the above-described handover procedures are improved.

Referring back to FIGS. 2 and 3, an operation of each of the macro base station MeNB and the radio terminal UE according to the first embodiment is described.

As shown in FIG. 2, the storage unit 130 of the macro base station MeNB according to the first embodiment stores in advance multiple parameters (parameters for each movement speed) including a first parameter for high-speed movement and a second parameter for non-high-speed movement as parameters to be included in a measurement configuration.

The first parameter for high-speed movement is configured to inhibit a measurement report which triggers handover to the pico base station PeNB. On the other hand, the second parameter for non-high-speed movement is configured to allow the measurement Report which triggers the handover to the pico base station PeNB.

For example, the first parameter for high-speed movement is configured as follows.

- The first parameter has the pico base station PeNB excluded from a measurement target.
- In the case of the event-triggered report, when the condition that RSRP/PSRQ of the pico base station PeNB exceeds a threshold is used as a reporting condition, the threshold of the first parameter is set to be significantly higher than a threshold of the second parameter.
- In the case of the event-triggered report, when the condition that a value obtained by adding an offset to RSRP/RSRQ of the macro base station MeNB becomes lower than RSRP/RSRQ of the pico base station PeNB is used as a reporting condition, the first parameter is set as an offset value by which the RSRP/RSRQ of the macro base station MeNB is increased.

Also, the controller 140 of the macro base station MeNB controls the radio communication unit 110 so that the parameters for respective movement speeds which are stored in the storage unit 130 are read, and, thereafter, transmit the measurement configuration including the read parameters for respective movement speeds. As described above, in the first embodiment, the radio communication unit 110 and the controller 140 correspond to notification units configured to notify the radio terminal UE of the plurality of parameters including the first parameter for high-speed movement and the second parameter for non-high-speed movement.

As shown in FIG. 3, the radio communication unit 210 of the radio terminal UE according to the first embodiment receives the measurement configuration including the parameters for respective movement speeds. In other words, in the first embodiment, the radio communication unit 210 corresponds to a receiver configured to receive the plurality of parameters including the first parameter for high-speed movement and the second parameter for non-high-speed movement.

Also, the controller 260 of the radio terminal UE corresponds to an acquisition unit configured to acquire movement speed information indicating a movement speed of the radio terminal UE. For example, the controller 260 acquires movement speed information as follows.

- The controller 260 measures a fading frequency of a radio signal which is received by the radio communication unit 210. Since a higher fading frequency means that the radio terminal UE is moving at a higher speed, a movement speed which is estimated by the fading frequency or a distribution of the fading frequency is used as movement speed information.
- The controller 260 measures the number of handovers/the number of cell reselections per unit time. Since the larger number of handovers/the higher number of cell reselections per unit time means that the radio terminal UE is moving at a higher speed, a movement speed which is estimated by the number of handovers/the number of cell reselections per unit time is used as movement speed information.
- The controller 260 measures a travelling distance per unit time using a GPS receiver 230 when the radio terminal UE has the GPS receiver 230. Accordingly, a movement speed is obtained from the travelling distance per unit time, and thus the obtained movement speed is used as movement speed information.
- The controller 260 acquires the movement speed information by inquiring a network (the radio access network E-UTRAN or the core network EPC) about the movement speed of the radio terminal UE.

Also, the controller 260 corresponds to a selector configured to select a parameter corresponding to the acquired movement speed information from the parameters for respective movement speeds which are received by the radio communication unit 210. For example, the controller 260 selects the first parameter for high-speed movement when the movement speed information indicates high-speed movement. The controller 260 performs the above-described measurement processing using the selected parameter.

Next, referring to FIGS. 7 and 8, the measurement configuration transmission processing and the measurement processing according to the first embodiment are described.

FIG. 7 is a flowchart of the measurement configuration transmission processing according to the first embodiment.

As shown in FIG. 7, at step S101, the macro base station MeNB transmits the measurement configuration including the plurality of parameters (parameters for respective movement speeds) including the first parameter for high-speed movement and the second parameter for non-high-speed parameter.

FIG. 8 is a flowchart of the measurement processing according to the first embodiment.

As shown in FIG. 8, at step S201, the radio terminal UE receives the measurement configuration including the parameters for respective movement speeds.

At step S202, the radio terminal UE acquires the movement speed information indicating the movement speed of the radio terminal UE.

At step S203, the radio terminal UE selects a parameter corresponding to the movement speed information acquired at step S202 from the parameters for respective movement speeds received at step S201.

At step S204, the radio terminal UE measures RSRP/RSRQ of a measurement target base station (a measurement target cell) which is designated by the parameter selected at step S203.

At step S205, the radio terminal UE decides whether the measurement result obtained at step S204 satisfies the reporting condition which is designated by the parameter selected at step S203.

When it is decided that the reporting condition is satisfied (step S205; YES), at step S206, the radio terminal UE transmits a measurement report relating to the measurement result obtained at step S204 to the macro base station MeNB.

As described above, according to the first embodiment, the micro base station MeNB transmits the measurement configuration including the parameters for respective movement speeds, and the radio terminal UE selects and uses the parameter corresponding to the movement speed of the radio terminal UE from the parameters for respective movement speeds, so that the handover to the pico base station PeNB can be avoided and unnecessary handover in the heterogeneous network can be prevented.

Second Embodiment

In the second embodiment, the measurement processing (step S2 in FIG. 6) in the above-described handover procedures is improved.

Referring to FIG. 3, an operation of a radio terminal UE according to the second embodiment is described.

As shown in FIG. 3, a radio communication unit 210 of the radio terminal UE according to the second embodiment receives a measurement configuration including parameters from a macro base station MeNB. In other words, in the second embodiment, the radio communication unit 210 corresponds to a receiver configured to receive the parameters.

Also, a controller 260 of the radio terminal UE corresponds to an acquisition unit configured to acquire movement speed information. A method of acquiring the movement speed information is similar to that of the first embodiment.

Furthermore, the controller 260 corresponds to an adjustment unit configured to adjust the parameter which is received by the radio communication unit 210. Specifically, the controller 260 adjusts the parameter which is received by the radio communication unit 210 so that a measurement report which triggers handover to a pico base station PeNB is inhibited when the acquired movement speed information indicates high-speed movement.

For example, the controller 260 adjusts the parameter as follows when the acquired movement speed information indicates high-speed movement.

- The parameter is set such that a pico base station PeNB is excluded from a measurement target.
- In the case of an the event-triggered report, when the condition that RSRP/PSRQ of the pico base station PeNB exceeds a threshold is used as the reporting condition, a threshold as the parameter is set to be significantly high.
- In the case of the event-triggered report, when the condition that a value obtained by adding an offset to RSRP/RSRQ of the macro base station MeNB becomes lower than RSRP/RSRQ of the pico base station PeNB is used as the reporting condition, offset processing is performed to relatively increase the RSRP/RSRQ of the macro base station MeNB.

With these adjustments, the measurement report which triggers the handover to the pico base station PeNB is inhibited. After that, the controller 260 performs the above-described measurement processing using the adjusted parameter.

Next, referring to FIG. 9, measurement processing according to the second embodiment is described. FIG. 9 is a flowchart of the measurement processing according to the second embodiment.

As shown in FIG. 9, at step S221, the radio terminal UE receives the measurement configuration including the parameter.

At step S222, the radio terminal UE acquires movement speed information indicating a movement speed of the radio terminal UE.

At step S223, the radio terminal UE decides whether the movement speed information acquired at step S222 indicates high-speed movement.

When it is decided that the movement speed information acquired at step S222 indicates high-speed movement (step S223; YES), at step S224, the radio terminal UE adjusts the parameter received at step S221 so that the measurement report which triggers the handover to the pico base station PeNB is inhibited. On the other hand, when it is decided that the movement speed information acquired at step S222 does not indicate high-speed movement (step S223; NO), the radio terminal UE proceeds to step S225.

At step S225, the radio terminal UE measures RSRP/RSRQ of a measurement target base station (a measurement target cell) which is designated by the parameter.

At step S226, the radio terminal UE decides whether the measurement result obtained at step S225 satisfies a reporting condition which is designated by the parameter.

When it is decided that the reporting condition is satisfied (step S226; YES), at step S227, the radio terminal UE transmits the measurement report relating to the measurement result obtained at step S225 to the macro base station MeNB.

As described above, according to the second embodiment, the radio terminal UE adjusts the parameter included in the received measurement configuration when the movement speed of the radio terminal UE is a high speed, so that the handover to the pico base station PeNB can be avoided and unnecessary handover in the heterogeneous network can be prevented.

Third Embodiment

In the third embodiment, the measurement configuration transmission processing (step S1 in FIG. 6) in the above-described handover procedures is improved.

Referring back to FIG. 2, an operation of a macro base station MeNB according to the third embodiment is described.

As shown in FIG. 2, a storage unit 130 of the macro base station MeNB according to the third embodiment stores in advance multiple parameters (parameters for respective movement speeds) including the first parameter for high-speed movement and the second parameter for non-high-speed movement as parameters to be included in a measurement configuration.

The first parameter for high-speed movement is configured to inhibit a measurement report which triggers handover to a pico base station PeNB. On the other hand, the second parameter for non-high-speed movement is configured to allow the measurement report which triggers the handover to the pico base station PeNB.

For example, the first parameter for high-speed movement is configured as follows.

- In the first parameter, a pico base station PeNB is excluded from a measurement target.
- In the case of the event-triggered report, when the condition that RSRP/PSRQ of the pico base station PeNB exceeds a threshold is used as the reporting condition, a threshold as the first parameter is set to be significantly higher than a threshold as the second parameter.
- In the case of the event-triggered report, when the condition that a value obtained by adding an offset to RSRP/RSRQ of the macro base station MeNB becomes lower than RSRP/RSRQ of the pico base station PeNB is used as the reporting condition, the first parameter is set as an offset value by which the RSRP/RSRQ of the macro base station MeNB is increased.

Also, a controller 140 of the macro base station MeNB corresponds to an acquisition unit configured to acquire movement speed information indicating a movement speed of the radio terminal UE. For example, the controller 140 acquires movement speed information as follows.

- The controller 140 measures a fading frequency of a radio signal which is received by the radio communication unit 110 from the radio terminal UE. Since a higher fading frequency means that the radio terminal UE is moving at a higher speed, a movement speed which is estimated by the fading frequency or a distribution of the fading frequency is used as movement speed information.
- The controller 140 demands the movement speed information from the radio terminal UE when the radio terminal UE can acquire the movement speed information, so that the movement speed information from the radio terminal UE is acquired.

The controller 140 acquires the movement speed information from the core network EPC by inquiring the core network EPC about the movement speed of the radio terminal UE.

Also, the controller 140 corresponds to a selector configured to select a parameter corresponding to the acquired movement speed information from the parameters for respective movement speeds which are stored in the storage unit 130. For example, the controller 140 selects the first parameter for high-speed movement when the movement speed information indicates high-speed movement.

After that, the controller 140 reads the selected parameter from the storage unit 130, and, thereafter, controls the radio communication unit 110 so that the measurement configuration including the parameter is transmitted. As described above, in the third embodiment, the radio communication unit 110 and the controller 140 correspond to notification units configured to notify the radio terminal UE of the selected parameter.

Figure 10:
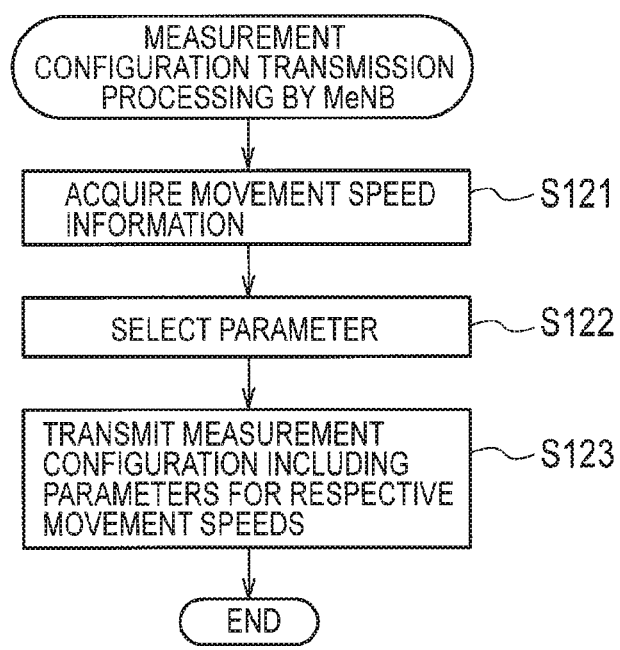
FIG. 10 is a flowchart of measurement configuration transmission processing according to the third embodiment.

Next, referring to FIG. 10, measurement configuration transmission processing according to the third embodiment is described. FIG. 10 is a flowchart of the measurement configuration transmission processing according to the third embodiment.

As shown in FIG. 10, at step S121, the macro base station MeNB acquires movement speed information indicating a movement speed of the radio terminal UE.

At step S122, the macro base station MeNB selects a parameter corresponding to the movement speed information acquired at step S121 from the parameters for respective movement speeds.

At step S123, the macro base station MeNB transmits the measurement configuration including the parameter selected at step S122 to the radio terminal UE.

As described above, according to the third embodiment, the micro base station MeNB selects a parameter which corresponds to the movement speed of the radio terminal UE from the parameters for respective movement speeds and includes the parameter in the measurement configuration, so that the handover to the pico base station PeNB can be avoided and unnecessary handover in the heterogeneous network can be prevented.

Fourth Embodiment

In the fourth embodiment, the handover decision processing (step S4 in FIG. 6) in the above-described handover procedures is improved.

Referring back to FIG. 2, an operation of a macro base station MeNB according to the fourth embodiment is described.

As shown in FIG. 2, a radio communication unit 110 of the macro base station MeNB according to the fourth embodiment corresponds to a receiver configured to receive a measurement report from a radio terminal UE.

Also, a controller 140 of the macro base station MeNB corresponds to an acquisition unit configured to acquire movement speed information indicating a movement speed of the radio terminal UE. A method of acquiring the movement speed information is similar to that of the third embodiment.

Also, the controller 140 decides whether the measurement report which is received by the radio communication unit 110 satisfies a condition for handover to a pico base station PeNB. For example, it is decided that a measurement ID corresponding to the pico base station PeNB is included in the measurement report and a measurement result corresponding to the measurement ID satisfies the handover condition.

Then, when it is decided that the condition for handover to the pico base station PeNB is satisfied, the controller 140 controls the network communication unit 120 so that the handover request for requesting an admission of a radio terminal UE is transmitted to the pico base station PeNB. In this manner, in the fourth embodiment, the network communication unit 120 and the controller 140 correspond to transmitters configured to transmit the handover request.

However, in a case where the condition for handover to the pico base station PeNB is satisfied but the acquired movement speed information indicates high-speed movement, the controller 140 performs control so that the transmission of the handover request to the pico base station PeNB is halted.

Figure 11:
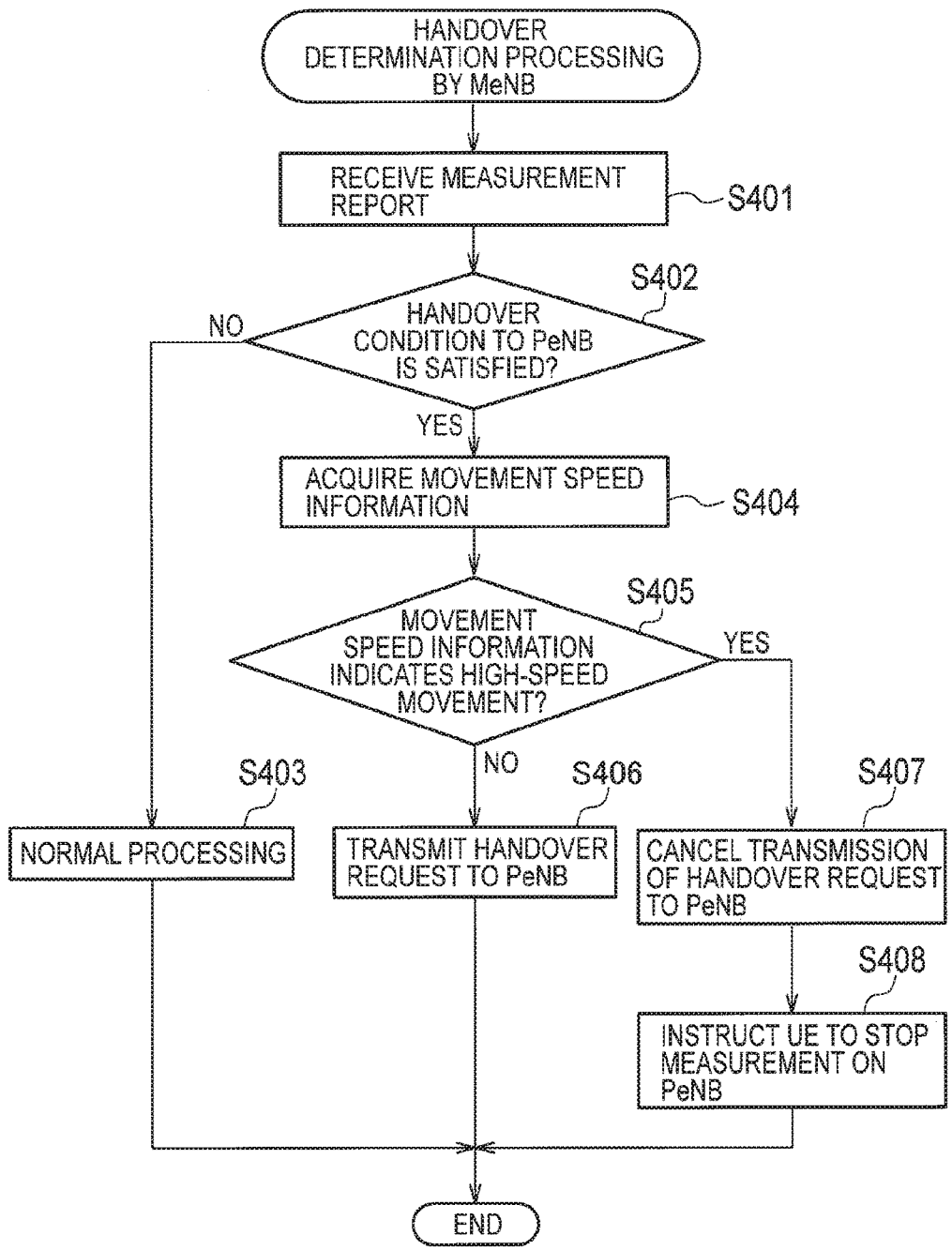
FIG. 11 is a flowchart of handover decision processing according to the fourth embodiment.

Next, referring to FIG. 11, handover decision processing according to the fourth embodiment is described. FIG. 11 is a flowchart of the handover decision processing according to the fourth embodiment.

As shown in FIG. 11, at step S401, the macro base station MeNB receives the measurement report from the radio terminal UE.

At step S402, the macro base station MeNB decides whether the measurement request received at step S401 satisfies the condition for handover to the pico base station PeNB.

When it is decided that the measurement report does not satisfy the condition for handover to the pico base station PeNB (step S402; NO), at step S403, the macro base station MeNB performs normal handover decision processing, that is, processing similar to the above-described handover procedures.

On the other hand, when it is decided that the measurement report satisfies the condition for handover to the pico base station PeNB (step S402; YES), at step S404, the macro base station MeNB acquires movement speed information indicating a movement speed of the radio terminal UE.

At step S405, the macro base station MeNB decides whether the movement speed information acquired at step S404 indicates high-speed movement.

When it is decided that the movement speed information acquired at step S404 does not indicate high-speed movement (step S405; NO), at step S406, the macro base station MeNB transmits the handover request to the pico base station PeNB.

On the other hand, when it is decided that the movement speed information acquired at step S404 indicates high-speed movement (step S405; YES), at step S407, the macro base station MeNB halts the transmission of the Handover request to the pico base station PeNB.

Furthermore, at step S408, the macro base station MeNB instructs the radio terminal UE to halt the processing for the measurement on the pico base station PeNB. Specifically, an instruction is given through the measurement configuration so that measurement on the pico base station PeNB is not performed or that a measurement result of the pico base station PeNB is not reported.

As described above, according to the fourth embodiment, in the case where the condition for handover to the pico base station PeNB is satisfied but the movement speed of the radio terminal UE is a high speed, the macro base station halts the transmission of the handover request to the pico base station PeNB, so that the handover to the pico base station PeNB can be avoided and unnecessary handover in the heterogeneous network can be prevented.

Also, according to the fourth embodiment, the transmission of the handover request is halted and then the radio terminal UE is instructed to halt the processing for the measurement on the pico base station PeNB. This can prevent a similar measurement report from being repeatedly generated and can decrease the overhead.

Fifth Embodiment

The fifth embodiment is such that the handover decision processing (step S4 in FIG. 6), the handover request transmission processing (S5 in FIG. 6), and the admission decision processing (step S6 in FIG. 6) in the above-described handover procedures are improved.

Referring back to FIGS. 2 and 4, an operation of each of a macro base station MeNB and a pico base station PeNB according to the fifth embodiment is described.

As shown in FIG. 2, a radio communication unit 110 of the macro base station MeNB according to the fifth embodiment corresponds to a receiver configured to receive a measurement report from a radio terminal UE.

Also, a controller 140 of the macro base station MeNB corresponds to an acquisition unit configured to acquire movement speed information indicating a movement speed of the radio terminal UE. A method of acquiring the movement speed information is similar to that of the third embodiment.

Also, the controller 140 decides whether the measurement report which is received by the radio communication unit 110 satisfies a condition for handover to a neighboring base station. Then, when it is decided that the condition for handover to the neighboring base station is satisfied, the controller 140 controls the network communication unit 120 so that the handover request for requesting an admission of the radio terminal UE is transmitted to the neighboring base station. In this manner, in the fourth embodiment, the network communication unit 120 and the controller 140 correspond to transmitters configured to transmit the handover request.

However, the controller 140 performs control so that the handover request including the high-speed movement information is transmitted when the acquired movement speed information indicates high-speed movement. The high-speed movement information is, for example, 1-bit information (flag) in which "1" indicates high-speed movement and "0" indicates movement slower than the high-speed movement. Note that the information is not limited to the 1-bit information but may be multiple-bits information so that movement speed can be expressed more in detail.

Note that, in the fifth embodiment, the macro base station MeNB does not need to know whether a base station as a transmission destination of the handover request is a pico base station.

As shown in FIG. 4, the network communication unit 320 of the pico base station PeNB according to the fifth embodiment corresponds to a receiver configured to receive a measurement request.

A controller 340 of the pico base station PeNB decides whether the handover request which is received by the network communication unit 320 includes high-speed movement information. The controller 340 controls the network communication unit 320 so that the handover request Ack is transmitted to a transmission source of the handover request when the high-speed movement information is not included in the handover request and another admission condition is satisfied.

However, in a case where another admission condition is satisfied but the high-speed movement information is included in the handover request, the controller 340 performs control of terminating the transmission of the handover request Ack and of not responding to the handover request or transmitting a handover request Nack.

In this manner, in the fifth embodiment, the network communication unit 320 and the controller 340 correspond to transmitters configured to transmit the handover request Ack or handover request Nack.

Note that when a macro base station MeNB' receives a handover request including high-speed movement information, the macro base station MeNB' performs admission decision processing by ignoring the high-speed movement information.

Figure 12:
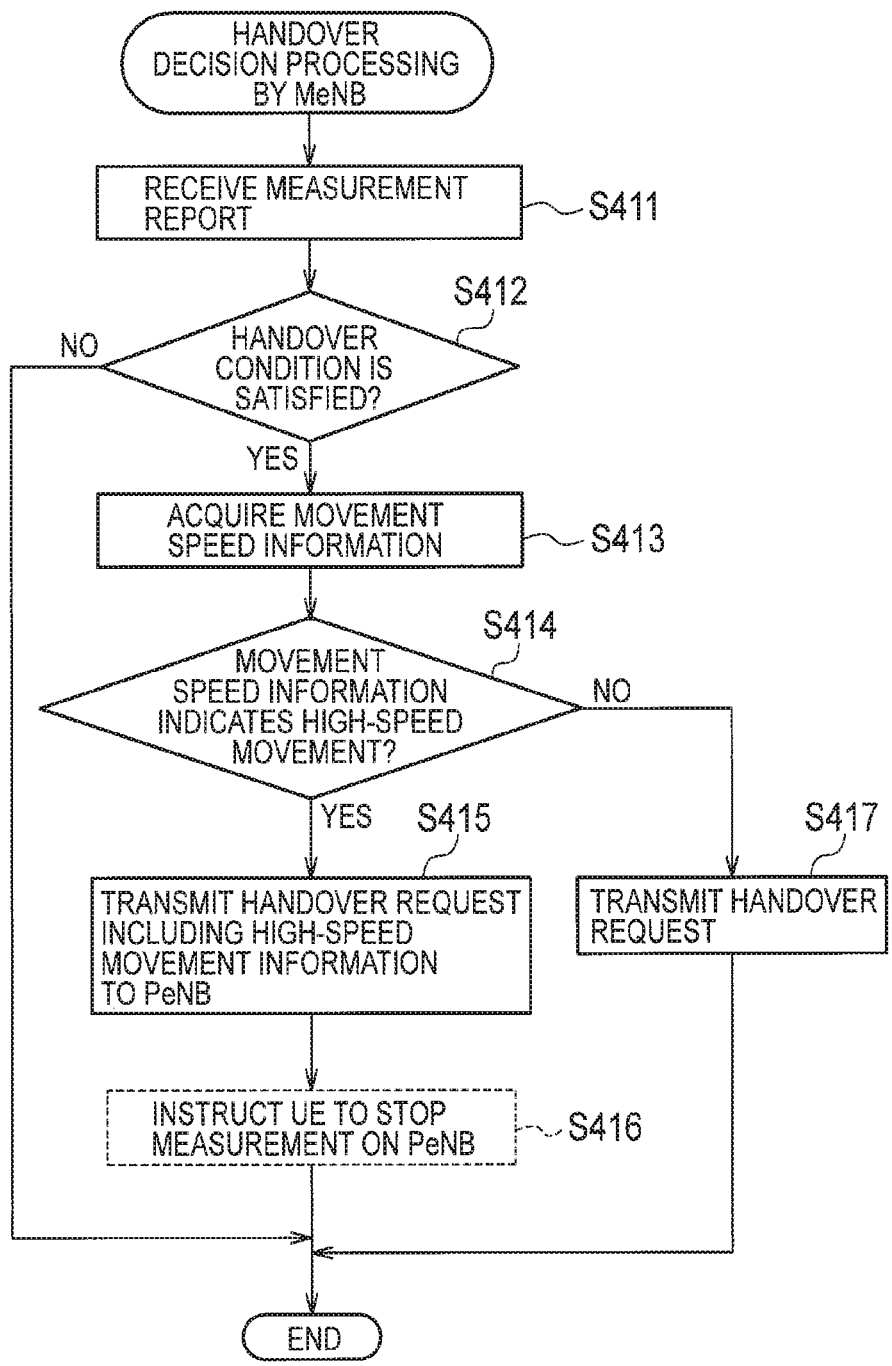
FIG. 12 is a flowchart of handover decision processing and handover request transmission processing according to the fifth embodiment.

Next, referring to FIG. 12, handover decision processing and handover request transmission processing according to the fifth embodiment are described. FIG. 12 is a flowchart of handover decision processing and handover request transmission processing according to the fifth embodiment.

As shown in FIG. 12, at step S411, the macro base station MeNB receives the measurement report from the radio terminal UE.

At step S412, the macro base station MeNB decides whether the measurement report received at step S411 satisfies a condition for handover to a neighboring base station.

When it is decided that the measurement report satisfies the condition for handover to a pico base station PeNB (step S412; YES), at step S413, the macro base station MeNB acquires movement speed information indicating a movement speed of the radio terminal UE.

At step S414, the macro base station MeNB decides whether the movement speed information acquired at step S404 indicates high-speed movement.

When it is decided that the movement speed information acquired at step S413 does not indicate high-speed movement (step S414; NO), at step S417, the macro base station MeNB transmits a normal handover request to the pico base station PeNB.

On the other hand, when it is decided that the movement speed information acquired at step S413 indicates high-speed movement (step S414; YES), at step S415, the macro base station MeNB transmits the handover request including the high-speed movement information to the neighboring base station.

Note that when the type of the base station as the transmission destination of the handover request has been identified as the pico base station, the macro base station MeNB may transmit the handover request including the high-speed movement information to the pico base station PeNB, and thereafter, at step S416, may instruct the radio terminal UE to halt the processing for the measurement on the pico base station PeNB. Specifically, instruction is given through the measurement configuration so that measurement on the pico base station PeNB is not performed, or that a measurement result of the pico base station PeNB is not reported.

Figure 13:
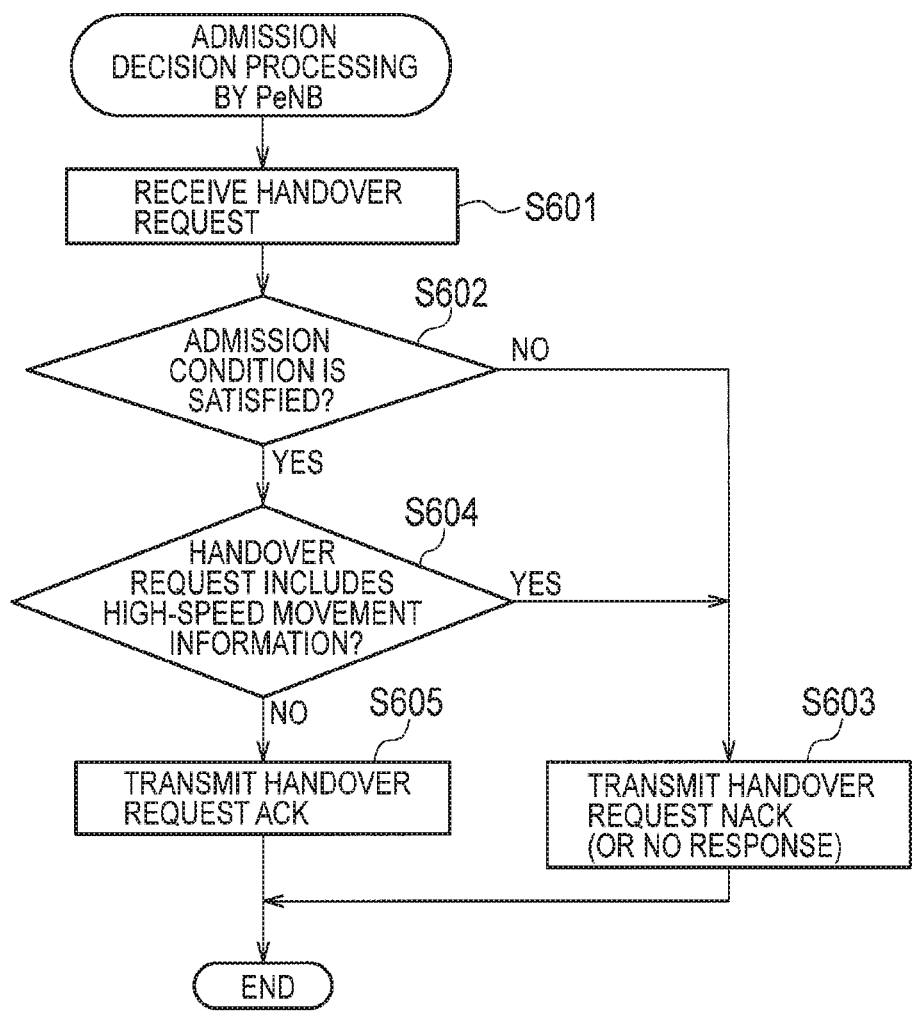
FIG. 13 is a flowchart of admission decision processing according to the fifth embodiment.

Next, referring to FIG. 13, admission decision processing according to the fifth embodiment is described. FIG. 13 is a flowchart of admission decision processing according to the fifth embodiment.

As shown in FIG. 13, at step S601, the pico base station MeNB receives a handover request from the macro base station MeNB.

At step S602, the pico base station PeNB decides whether the handover request received at step S601 satisfies an admission condition.

When it is decided that the admission condition is not satisfied (step S602; NO), at step S603, the pico base station PeNB transmits a handover request Nack to the macro base station MeNB. Alternatively, when determination is made on the basis of time-out on the macro base station MeNB side, the pico base station PeNB may not transmit anything to the macro base station MeNB.

On the other hand, when it is decided that the admission condition is satisfied (step S602; YES), at step S604, the pico base station PeNB decides whether the handover request received at step S601 includes high-speed movement information. Note that, when the high-speed movement information is configured of multiple bits, the radio terminal UE is moving at a high speed may be decided by translating the contents of the high-speed movement information.

When it is decided that the movement speed information received at step S601 does not include high-speed movement information (step S604; NO), at step S605, the pico base station PeNB transmits the handover request Ack to the macro base station MeNB.

On the other hand, when it is decided that the handover request received at step S601 includes high-speed movement information (step S604; YES), at step S603, the pico base station PeNB transmits the handover request Nack to the macro base station MeNB. Alternatively, when decision is made on the basis of time-out on the macro base station MeNB side, the pico base station PeNB may not transmit anything to the macro base station MeNB.

As described above, according to the fifth embodiment, when the movement speed of the radio terminal UE is a high speed, the macro base station MeNB notifies the pico base station PeNB of that that the movement speed of the radio terminal UE is a high speed by using the handover request. When it is notified that the movement speed of the radio terminal UE is a high speed, the pico base station PeNB rejects the handover request. Thus, the handover to the pico base station PeNB can be avoided and unnecessary handover in the heterogeneous network can be prevented.

Also, according to the fifth embodiment, the macro base station MeNB notifies the pico base station PeNB that the movement speed of the radio terminal UE is a high speed and, thereafter, instructs the radio terminal UE to halt the processing for the measurement on the pico base station PeNB. This can prevent a similar measurement report from being repeatedly generated and can decrease the overhead.

Sixth Embodiment

In the sixth embodiment, the admission decision processing (step S6 in FIG. 6) in the above-described handover procedures is improved.

Referring back to FIG. 4, an operation of a pico base station PeNB according to the sixth embodiment is described.

As shown in FIG. 4, a network communication unit 320 of the pico base station PeNB according to the sixth embodiment corresponds to a receiver configured to receive the handover request for requesting an admission of a radio terminal UE from a neighboring base station. The handover request includes identification information on the radio terminal UE.

Also, when the network communication unit 320 receives the handover request from the neighboring base station, the controller 340 of the pico base station PeNB requests the core network EPC for movement speed information indicating a movement speed of the radio terminal UE, and acquires the movement speed information from the core network EPC. For example, the mobility management device MME included in the core network EPC manages the number of handovers/the number of cell reselections per unit time of the radio terminal UE. Thus, movement speed information can be obtained from that information. Alternatively, when a location information management device to manage information on a current location of the radio terminal UE is provided in the core network EPC, the movement speed information can be obtained from information which is managed by the location information management device.

The controller 340 decides whether the acquired movement speed information indicates high-speed movement. The controller 340 controls the network communication unit 320 so as to transmit the handover request Ack to a transmission source of the handover request when it is decided that the movement speed information does not indicate high-speed movement and another admission condition is satisfied.

On the other hand, in a case where another admission condition is satisfied but the movement speed information indicates high-speed movement, the controller 340 performs control of terminating the transmission of the handover request Ack and of not responding to the handover request or transmitting the handover request Nack.

In this manner, in the sixth embodiment, the network communication unit 320 and the controller 340 correspond to transmitters configured to transmit the handover request Ack or the handover request Nack.

Figure 14:
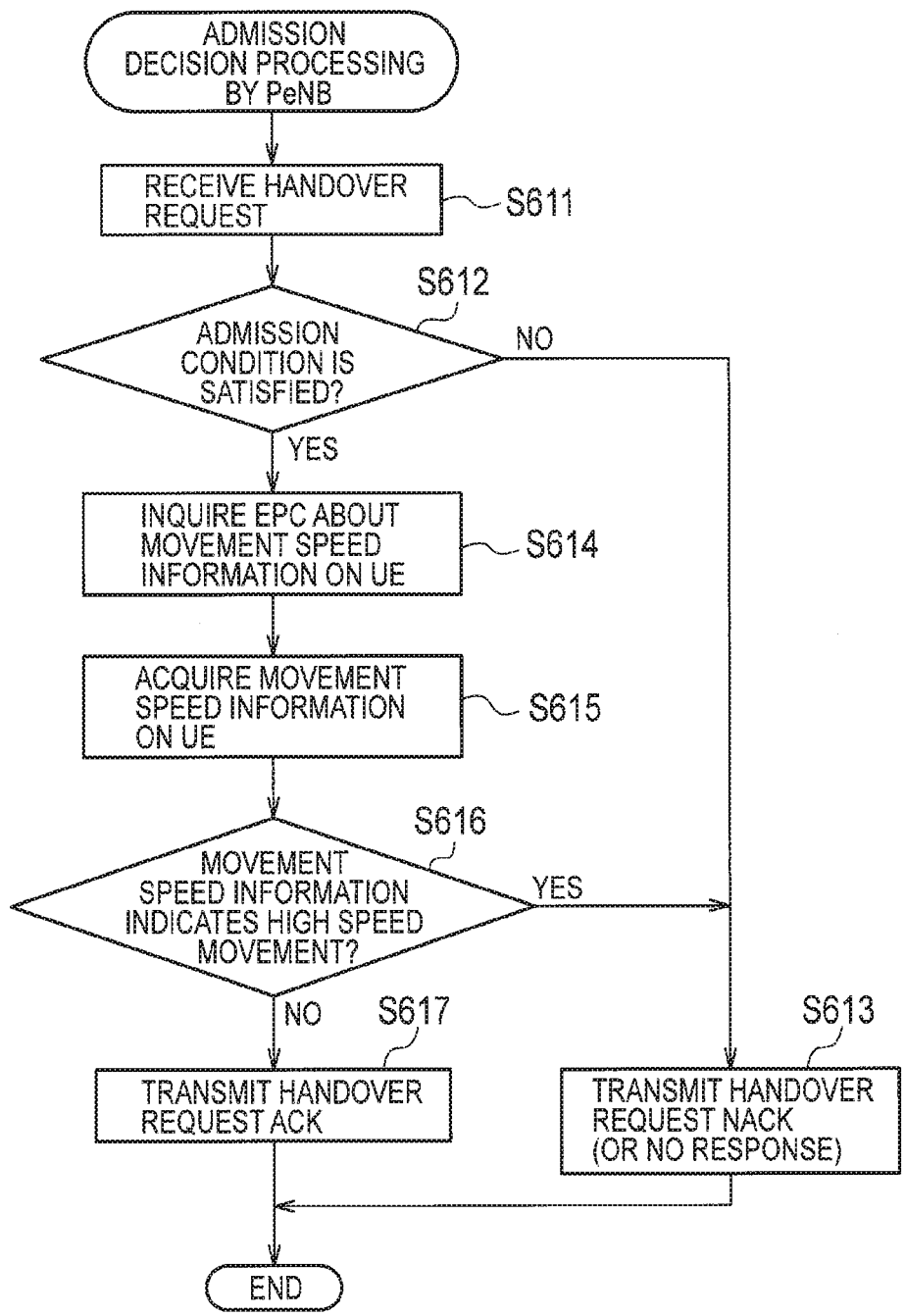
FIG. 14 is a flowchart of admission decision processing according to the sixth embodiment.

Next, referring to FIG. 14, admission decision processing according to the sixth embodiment is described. FIG. 14 is a flowchart of the admission decision processing according to the sixth embodiment.

As shown in FIG. 14, at step S611, the pico base station PeNB receives a handover request from the macro base station MeNB.

At step S612, the pico base station PeNB decides whether the handover request received at step S611 satisfies an admission condition.

When it is decided that the admission condition is not satisfied (step S612; NO), at step S613, the pico base station PeNB transmits the handover request Nack to the macro base station MeNB. Alternatively, when decision is made on the basis of time-out on the macro base station MeNB side, the pico base station PeNB may not transmit anything to the macro base station MeNB.

On the other hand, when it is decided that the admission condition is satisfied (step S612; YES), at step S614, the pico base station PeNB inquires the network EPC about the movement speed information of the radio terminal UE by using the identification information of the radio terminal UE included in the handover request received at step S611.

At step S615, the pico base station PeNB acquires the movement speed information obtained by the inquiry at step S614.

At step S616, the pico base station PeNB decides whether the movement speed information acquired at step S615 indicates high-speed movement.

When it is decided that the movement speed information acquired at step S615 does not indicate high-speed movement (step S616; NO), at step S617, the pico base station PeNB transmits the handover request Ack to the macro base station MeNB. On the other hand, when it is decided that the movement speed information acquired at step S615 indicates high-speed movement (step S616; YES), at step S613, the pico base station PeNB transmits the handover request Nack to the macro base station MeNB. Or, when decision is made on the basis of time-out on the macro base station MeNB side, the pico base station PeNB may not transmit anything to the macro base station MeNB.

As described above, according to the sixth embodiment, when receiving the handover request, the pico base station PeNB acquires movement speed information of the radio terminal UE from the core network EPC. When the acquired movement speed information indicates high-speed movement, the pico base station PeNB rejects the handover request, so that the handover to the pico base station PeNB can be avoided and unnecessary handover in the heterogeneous network can be prevented.

Seventh Embodiment

In the seventh embodiment the measurement processing (step S2 in FIG. 6) in the above-described handover procedures is improved.

Referring back to FIG. 3, an operation of a radio terminal UE according to the seventh embodiment is described.

As shown in FIG. 3, a controller 260 of the radio terminal UE according to the seventh embodiment corresponds to a measurement unit configured to perform measurement according to a parameter included in the measurement configuration which is received by the radio communication unit 210.

Also, the controller 260 corresponds to an acquisition unit configured to acquire movement speed information indicating a movement speed of the radio terminal UE. A method of acquiring the movement speed information is similar to that of the first embodiment.

Furthermore, the controller 260 controls the radio communication unit 210 so as to transmit a measurement report including measurement information on a measurement result of the macro base station MeNB. The measurement information is configured by associating the measurement result (RSRP/RSRQ) with a measurement ID of a base station (a cell) as a measurement target. In the seventh embodiment, the radio communication unit 210 and the controller 260 correspond to reporting units configured to report the measurement information to the macro base station MeNB.

When the measurement result of the pico base station PeNB is obtained and the obtained movement speed information indicates high-speed movement, the controller 260 performs control so that a measurement report from which the measurement information on the measurement result of the pico base station PeNB is excluded is transmitted. In a case where, with the measurement, a measurement result 1 is obtained for a measurement ID of a macro base station MeNB' and a measurement result 2 is obtained for a measurement ID of the pico base station PeNB, the measurement report is transmitted without including the measurement information for the pico base station PeNB (the measurement ID and the measurement result 2), but including the measurement information for the macro base station MeNB' (the measurement ID and the measurement result 1).

Figure 15:
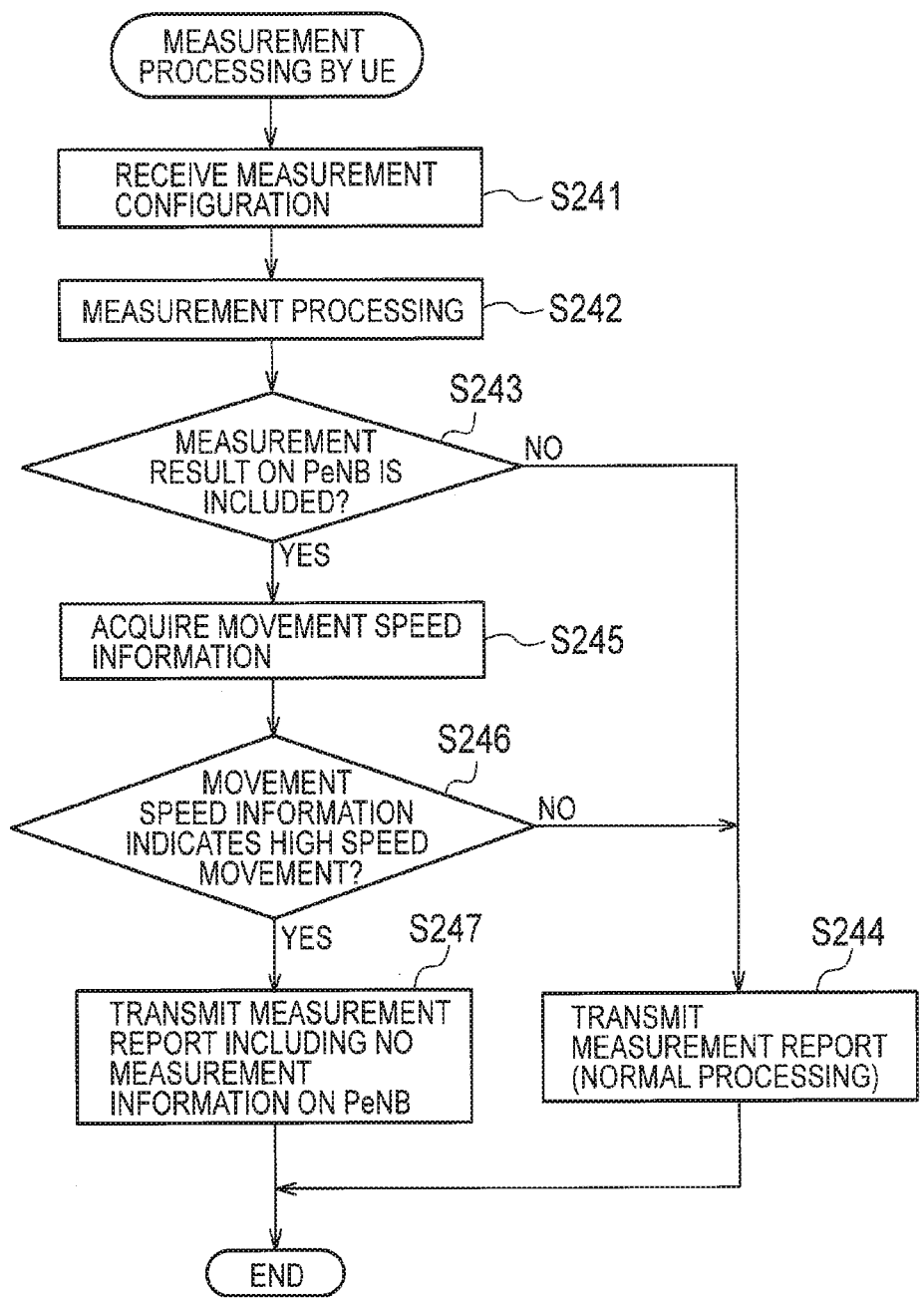
FIG. 15 is a flowchart of measurement processing according to the seventh embodiment.

Next, referring to FIG. 15, measurement processing according to the seventh embodiment is described. FIG. 15 is a flowchart of measurement processing according to the seventh embodiment.

As shown in FIG. 15, at step S241, the radio terminal UE receives a measurement configuration.

At step S242, the radio terminal UE measures RSRP/RSRQ of a measurement target base station (a measurement target cell) which is designated by a parameter which is included in the measurement configuration.

At step S243, the radio terminal UE decides whether the measurement result obtained at step S242 includes a measurement result of the pico base station PeNB.

When it is decided that the measurement result of the pico base station PeNB is not included (step S243; NO), at step 244, the radio terminal UE performs measurement report decision and transmission processing as usual.

On the other hand, when it is decided that the measurement result of the pico base station PeNB is included (step S243; YES), at step S245, the radio terminal UE acquires movement speed information indicating a movement speed of the radio terminal UE.

At step S246, the radio terminal UE decides whether the movement speed information acquired at step S245 indicates high-speed movement.

When it is decided that the movement speed information acquired at step S246 does not indicate high-speed movement (step S246; NO), at step 244, the radio terminal UE performs measurement report decision and transmission processing as usual.

On the other hand, when it is decided that the movement speed information acquired at step S246 indicates high-speed movement (step S246; YES), at step S247, the radio terminal UE transmits the measurement Report from which the measurement information on the measurement result of the pico base station PeNB is excluded to the macro base station MeNB.

As described above, according to the seventh embodiment, the radio terminal UE moving a high speed does not to report the measurement information on the pico base station PeNB to the macro base station MeNB. Thus, the handover to the pico base station PeNB can be avoided and unnecessary handover in the heterogeneous network can be prevented.

Eighth Embodiment

In the eighth embodiment, the handover decision processing (step S4 in FIG. 6) in the above-described handover procedures is improved.

Referring back to FIG. 2, an operation of a macro base station MeNB according to the eighth embodiment is described.

As shown in FIG. 2, a radio communication unit 110 of the macro base station MeNB according to the eighth embodiment corresponds to a receiver configured to receive a measurement report from a radio terminal UE.

Also, a controller 140 of the macro base station MeNB corresponds to an acquisition unit configured to acquire movement speed information indicating a movement speed of the radio terminal UE. A method of acquiring the movement speed information is similar to that of the third embodiment.

Also, the controller 140 decides whether the measurement report which is received by the radio communication unit 110 includes measurement information (a measurement ID and a measurement result) on a pico base station PeNB.

Furthermore, the controller 140 corresponds to a decision unit configured to decide a handover target of the radio terminal UE on the basis of the measurement report which is received by the radio communication unit 110. When the acquired movement speed information indicates high-speed movement and the measurement report includes the measurement information on the pico base station PeNB, the controller 140 decides a handover target of the radio terminal UE after excluding the measurement information on the pico base station PeNB from the measurement report. In other words, when the acquired movement speed information indicates high-speed movement, the handover target of the radio terminal UE is decided without considering the measurement information on the pico base station PeNB.

Figure 16:
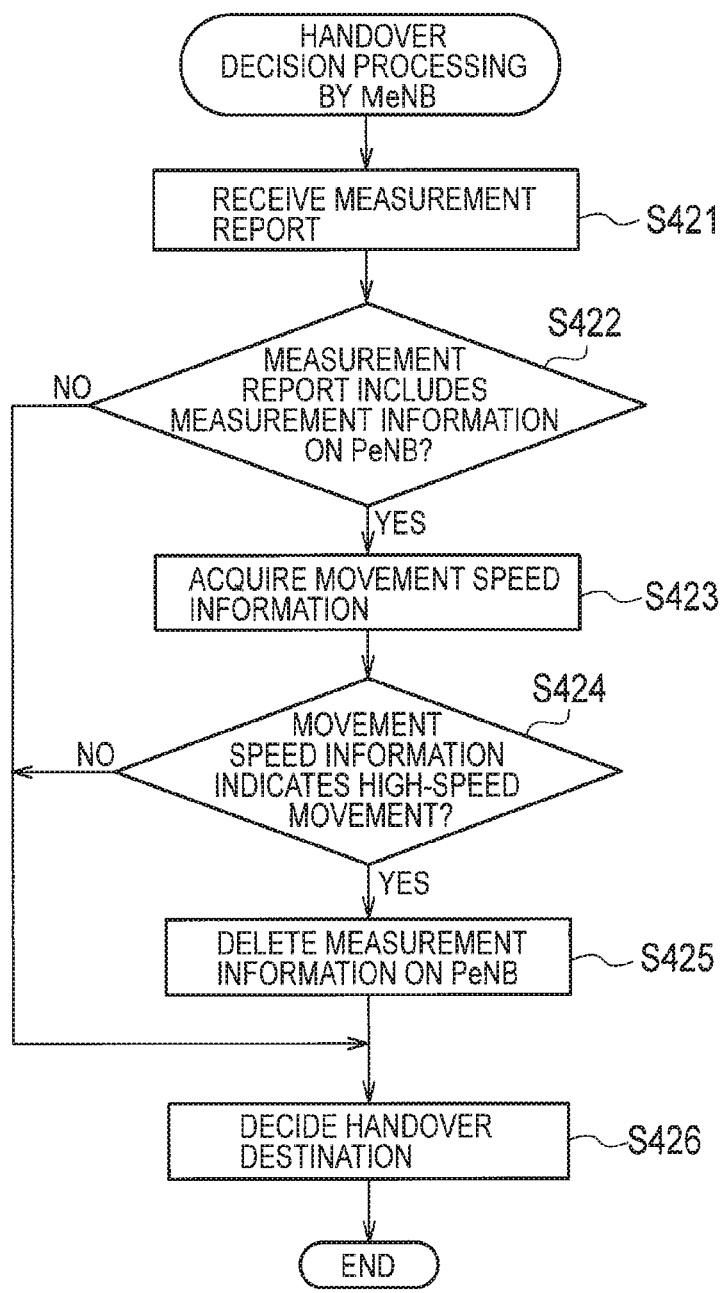
FIG. 16 is a flowchart of handover decision processing according to the eighth embodiment.

Next, referring to FIG. 16, handover decision processing according to the eighth embodiment is described. FIG. 16 is a flowchart of handover decision processing according to the eighth embodiment.

As shown in FIG. 16, at step S421, the macro base station MeNB receives a measurement report from the radio terminal UE.

At step S422, the macro base station MeNB decides whether the measurement report received at step S421 includes the measurement information on the pico base station PeNB.

When it is decided that the measurement report does not include the measurement information on the pico base station PeNB (step S422; NO), at step S426, the macro base station MeNB performs normal handover target decision processing, that is, processing similar to the above-described handover procedures.

On the other hand, when it is decided that the measurement report includes the measurement information on the pico base station PeNB (step S422; YES), at step S423, the macro base station MeNB acquires movement speed information indicating a movement speed of the radio terminal UE.

At step S424, the macro base station MeNB decides whether the movement speed information acquired at step S423 indicates high-speed movement.

When it is decided that the movement speed information does not indicate high-speed movement (step S424; NO), at step S426, the macro base station MeNB performs normal handover target decision processing.

On the other hand, when it is decided that the movement speed information indicates high-speed movement (step S424; YES), at step S425, the macro base station MeNB excludes (deletes) the measurement information on the pico base station PeNB from the measurement report. After that, at step S426, the handover target of the radio terminal UE is decided.

As described above, according to the eighth embodiment, when the radio terminal UE is moving at a high speed and the measurement report from the radio terminal UE includes the measurement information on the pico base station PeNB, the macro base station MeNB excludes the measurement information on the pico base station PeNB from the measurement report and decides the handover target of the radio terminal UE. Thus, the handover to the pico base station PeNB can be avoided and unnecessary handover in the heterogeneous network can be prevented.

Other Embodiments

As described above, the present invention has been described by using the above-described embodiments. However, it should not be understood that the description and the drawings, which constitute one part of this disclosure, are to limit the present invention. Various alternative embodiments, examples, and operational techniques will be obvious for those who are in the art from this disclosure.

In the above-described embodiments, the description is mainly given to handover in which a radio terminal UE in a connected state switches base stations. However, the first and second embodiments may be employed in a cell reselection.

Figure 17:
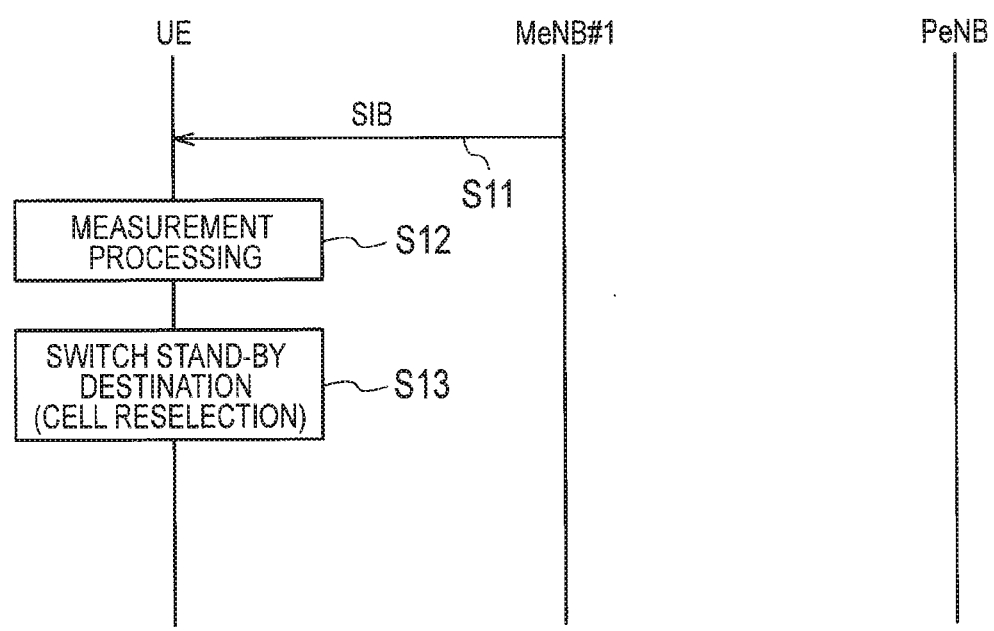
FIG. 17 is an operational sequence diagram of cell reselection procedures from the macro base station to the pico base station.

FIG. 17 is an operational sequence diagram of an operation of a radio terminal UE in an idle state reselecting a cell from a macro base station MeNB to a pico base station PeNB.

As shown in FIG. 17, at step S11, the macro base station MeNB broadcasts a system information block (SIB) which is broadcast information including a cell reselection parameter.

At step S12, the radio terminal UE performs measurement processing according to the cell reselection parameter included in the received SIB.

At step S13, the radio terminal UE switches a base station connected for stand-by (a cell connected for stand-by) according to the cell reselection parameter included in the received SIB.

FIG. 18 is an operational flowchart of the macro base station MeNB when the first embodiment is employed in the cell reselection.

As shown in FIG. 18, at step S111, the macro base station MeNB transmits SIB including cell reselection parameters for respective movement speeds. Here, the cell reselection parameter for high-speed movement is configured to inhibit a cell reselection to the pico base station PeNB.

FIG. 19 is an operational flowchart of the radio terminal UE when the first embodiment is applied to the cell reselection.

As shown in FIG. 19, at step S211, the radio terminal UE receives the SIB including the cell reselection parameters for respective movement speeds.

At step S212, the radio terminal UE acquires the movement speed information indicating a movement speed of the radio terminal UE.

At step S213, the radio terminal UE selects a cell reselection parameter corresponding to the movement speed information acquired at step S212 from the cell reselection parameters for respective movement speeds received at step S211.

At step S214, the radio terminal UE measures RSRP/RSRQ of a measurement target base station (a measurement target cell) which is designated by the cell reselection parameter selected at step S213.

At step S215, the radio terminal UE decides whether the measurement result obtained at step S214 satisfies a cell reselection condition which is designated by the cell reselection parameter selected at step S213.

When it is decided that the cell reselection condition is satisfied (step S215; YES), at step S216, the radio terminal UE executes the cell reselection.

As described above, by employing the first embodiment in the cell reselection, cell reselection to the pico base station PeNB by the radio terminal UE moving at a high speed can be avoided and an unnecessary cell reselection in the heterogeneous network can be prevented.

FIG. 20 is an operational flowchart of the radio terminal UE when the second embodiment is employed in the cell reselection.

As shown in FIG. 20, at step S231, the radio terminal UE receives SIB including cell reselection parameters.

At step S232, the radio terminal UE acquires movement speed information indicating a movement speed of the radio terminal UE.

At step S233, the radio terminal UE decides whether the movement speed information acquired at step S232 indicates high-speed movement.

When it is decided that the movement speed information acquired at step S232 indicates high-speed movement (step S233; YES), at step S234, the radio terminal UE adjusts a cell reselection parameter received at step S231 so as to inhibit the cell reselection to the pico base station PeNB. On the other hand, when it is decided that the movement speed information acquired at step S232 does not indicate high-speed movement (step S233; NO), the radio terminal UE can proceed to step S235.

At step S235, the radio terminal UE measures RSRP/RSRQ of a measurement target base station (a measurement target cell) which is designated by the cell re selection parameter.

At step S236, the radio terminal UE decides whether the measurement result obtained at step S235 satisfies the cell reselection condition which is designated by the cell reselection parameter.

When it is decided that the cell reselection condition is satisfied (step S236; YES), at step S237, the radio terminal UE executes the cell reselection.

As described above, by employing the second embodiment in the cell re selection, cell reselection to the pico base station PeNB by the radio terminal UE moving at a high speed can be avoided and an unnecessary cell reselection in the heterogeneous network can be prevented.

Note that, in the first to the eighth embodiments, the description is given with a pico base station which is a type of a low-power base station as an example. However, not only the pico base station but also a femto base station (also referred to as a home base station) which is a base station forming a cell smaller than a cell formed by the pico base station or a relay node which is a base station wirelessly forming a backhaul may be set as a low-power base station according to the present invention.

Thus it should be understood that the present invention includes various embodiments not described herein.

What is claimed is:

1. A mobile communication method used for a handover control, comprising the steps of:

transmitting, by a base station connected to a radio terminal, a measurement configuration that configures an event-trigger-type measurement report, to the radio terminal, wherein
the measurement configuration simultaneously includes both: a first report condition parameter configured to suppress transmission of a measurement report corresponding to cells to be measured by the radio terminal when number of handovers per unit time exceeds a predetermined value, and a second report condition parameter which is used as alternative to the first report condition parameter,
the event-trigger-type measurement report occurs in response to an event that satisfies the first report condition parameter in the radio terminal, and
the event-trigger-type measurement report occurs in response to an event that satisfies the second report condition parameter in the radio terminal;

receiving, by the radio terminal, the measurement configuration from the base station;

based on the number of handovers per unit time, adjusting the first report condition parameter to suppress the transmission of measurement report when the number of handovers per unit time exceeds the predetermined value; and transmitting a measurement report from the radio terminal to the base station in response to an event that satisfies that the second report condition parameter has occurred in the radio terminal.

2. A radio terminal, comprising:

a receiver that receives a measurement configuration that configures an event-trigger-type measurement report, from a base station connected to the radio terminal; and a controller that transmits an event-trigger-type measurement report to the base station when a report condition corresponding to the measurement configuration is satisfied, wherein
the measurement configuration simultaneously includes both: a first report condition parameter configured to suppress transmission of a measurement report corresponding to cells to be measured by the radio terminal when number of handovers per unit time exceeds a predetermined value, and a second report condition parameter which is used as alternative to the first report condition parameter,
the event-trigger-type measurement report occurs in response to an event that satisfies the first report condition parameter in the radio terminal, and
the event-trigger-type measurement report occurs in response to an event that satisfies the second report condition parameter in the radio terminal; and wherein based on the number of handovers per unit time, the controller adjusts the first report condition parameter to suppress the transmission of measurement report when the number of handovers per unit time exceeds the predetermined value; and the controller transmits a measurement report from the radio terminal to the base station in response to an event that satisfies that the second report condition parameter has occurred in the radio terminal.

* * * * *